(12) United States Patent
Enuka et al.

(10) Patent No.: US 11,531,931 B2
(45) Date of Patent: Dec. 20, 2022

(54) MACHINE LEARNING SYSTEM AND METHODS FOR DETERMINING CONFIDENCE LEVELS OF PERSONAL INFORMATION FINDINGS

(71) Applicant: BigID Inc., New York, NY (US)

(72) Inventors: Yehoshua Enuka, Gimzo (IL); Nimrod Vax, Tel Aviv (IL); Eyal Sacharov, Herzliya (IL); Itamar Apel, Nir Galim (IL)

(73) Assignee: BigID Inc., New York, NY (US)

(*) Notice: Subject to any disclaimer, the term of this patent is extended or adjusted under 35 U.S.C. 154(b) by 699 days.

(21) Appl. No.: 16/539,552

(22) Filed: Aug. 13, 2019

(65) Prior Publication Data

US 2020/0050966 A1 Feb. 13, 2020

Related U.S. Application Data

(60) Provisional application No. 62/718,349, filed on Aug. 13, 2018.

(51) Int. Cl.
*G06K 9/62* (2022.01)
*G06N 3/08* (2006.01)
*G06F 17/40* (2006.01)
*G06N 20/00* (2019.01)
*G06F 17/18* (2006.01)

(52) U.S. Cl.
CPC .......... *G06N 20/00* (2019.01); *G06F 17/18* (2013.01); *G06K 9/6215* (2013.01); *G06K 9/6267* (2013.01)

(58) Field of Classification Search
USPC ............... 382/100–102, 154–160, 181–225; 706/12–56, 934, 900–902; 726/1–35
See application file for complete search history.

(56) References Cited

U.S. PATENT DOCUMENTS

| | | | |
|---|---|---|---|
| 9,501,744 B1 | 11/2016 | Brisebois et al. | |
| 11,113,633 B2 * | 9/2021 | Enuka | G06K 9/6263 |
| 11,238,176 B1 * | 2/2022 | Vax | G06F 16/2457 |
| 2004/0181526 A1 | 9/2004 | Burdick et al. | |
| 2012/0054213 A1 | 3/2012 | Puttaswamy et al. | |
| 2013/0246342 A1 | 9/2013 | Faith et al. | |
| 2014/0188921 A1 | 7/2014 | Thomason et al. | |
| 2015/0036138 A1 | 2/2015 | Watson et al. | |
| 2015/0215348 A1 | 7/2015 | Koeten et al. | |
| 2017/0109852 A1 | 4/2017 | Ito | |

OTHER PUBLICATIONS

International Search Report and Written Opinion issued for PCT/US2019/046352, dated Oct. 24, 2019, 11 pp.
Wu et al., "Top 10 algorithms in data mining." In: Knowledge and information systems 14:1-37, Dec. 4, 2007, Retrieved on Oct. 8, 2019 from.

* cited by examiner

*Primary Examiner* — Marcellus J Augustin
(74) *Attorney, Agent, or Firm* — Dorsey & Whitney LLP

(57) ABSTRACT

The disclosed privacy management platforms are adapted to scan any number of data sources in order to provide users with visibility into stored personal information, risk associated with storing such information and/or usage activity relating to such information. The platforms may correlate personal information findings to specific data subjects and may employ machine learning models to classify findings as corresponding to a particular personal information attribute to provide an indexed inventory across multiple data sources.

20 Claims, 14 Drawing Sheets

|    | UserID 540 | FullName 550 | Language 560 | Promo 570 |
|----|------------|--------------|--------------|-----------|
| 1  | prt111 541 | John Smith 551 | US 561 | 1 571 |
| 2  | prt111 542 | Ron Jeffries | US | 1 |
| 3  | abf578 543 | Jessica Wu | US | 1 |
| 4  | fgc473 544 | Nick Wanka | CA | 1 |
| 5  | dhc645 545 | Katie Sherry | MX | 1 |
| 6  | hdr830 546 | 0 556 | US | 1 |
| 7  | isw237 547 | 0 557 | MX | 1 |
| 8  | afo293 548 | Jenn Dykema | CA | 1 |
| 9  | aaa123 | Patrick Weber | US | 0 579 |
| 10 | fed107 | Jason Jackson | US | 1 |
| 11 | ouw837 | Leslie Wyatt | MX | 1 |
| 12 | uyr721 | Pablo Hapley | US | 1 |
| 13 | crw333 | Robet White | US | 1 |
| 14 | tyz131 | Xander Newt | US | 1 |
| 15 | aje911 | Fester Knope | US | 1 |

|   | User 510 | Promo 520 | Country 530 |
|---|----------|-----------|-------------|
| 1 | 0 511 | 1 521 | US |
| 2 | prt111 512 | 0 522 | US |
| 3 | abf578 513 | 0 | US |
| 4 | fgc473 514 | 0 | CA |
| 5 | dhc645 515 | 1 | MX |
| 6 | hdr830 516 | 1 | US |
| 7 | isw237 517 | 1 | MX |
| 8 | afo293 518 | 1 | CA |
| 9 | *** 519 | 0 | US |

| Attribute Field Name | Scanned Field Name | Field Values Count | Field Findings Count | Field Unique Findings Count | Attribute Records Count | Field Record Count | MARTC | Sure Matches | Full Matches | Sure and Full Matches | Label |
|---|---|---|---|---|---|---|---|---|---|---|---|
| UserID | User | 5000 | 144 | 144 | 193 | 144 | 144 | 144 | 144 | 1 | 1 |
| Language | Country | 50000 | 11063 | 3 | 1107 | 2790 | 4690 | 0 | 1117 | 0 | 0 |
| Promo | Promo | 100001 | 100001 | 2 | 1203 | 1405 | 1203 | 0 | 1405 | 0 | 0 |

FIG. 9

Review Scan Results

Search

1200

| Schema | Collection | Field | Attribute Name | Attribute O... | Attribute Type | Field Count | Findings Count | Distinct Values | PII Records | Distinct IDs | Confidence Level | Calculated ... |
|---|---|---|---|---|---|---|---|---|---|---|---|---|
| integration | table_1 | zipcode | zipcode | zipcode | IDSoR Attribute | 5 | 5 | 5 | 7 | 5 | 3 - Low <u>1210</u> | <u>1220</u> 1 - High |
| integration | table_2 | country | Address | country | IDSoR Attribute | 5 | 4 | 2 | 5 | 4 | 3 - Low | 1 - High |

1201

Update Confidence Level
<u>1215</u>

1 - High <u>1217</u> ▽

Cancel | Update

FIG. 12

MACHINE LEARNING SYSTEM AND METHODS FOR DETERMINING CONFIDENCE LEVELS OF PERSONAL INFORMATION FINDINGS

CROSS-REFERENCE TO RELATED APPLICATIONS

The present application claims benefit of U.S. provisional patent application Ser. No. 62/718,349, titled "Machine Learning System and Methods for Determining Confidence Levels of Personal Information Findings," filed Aug. 13, 2018, which is incorporated by reference herein in its entirety.

BACKGROUND

This specification relates generally to data discovery and protection. More specifically, this specification relates to systems and methods for discovering and classifying personal information stored in any number of data sources.

In the digital economy, preserving customer confidence and trust requires protecting their personal identity information from loss, theft and misuse. Information technology and the Internet have made it easier to steal such personal information through breaches of Internet security, network security and web browser security, leading to a profitable market in collecting and reselling personal information. Such personal information may also be exploited by criminals to stalk or steal the identity of a person, or to aid in the planning of criminal acts.

The primary challenge most organizations face today, as it relates to data protection, is understanding where personal identity information is located across the organization's data centers. While there are a number of legacy data protection and data loss prevention ("DLP") solutions that attempt to address this issue, such applications typically employ classification algorithms based on regular expressions. Unfortunately, such solutions are not optimized to search for personal information specific to the customers of a given organization, cannot determine the identity of data subjects and cannot find contextual personal information.

There remains a need for data protection and customer privacy management systems that can identify and classify sensitive data stored throughout an organization's various data systems. It would be beneficial if such systems could provide an organized inventory of personal information, indexed by attribute, to facilitate the management of data risk and customer privacy.

SUMMARY

In accordance with the foregoing objectives and others, exemplary privacy management platforms are described herein. Such platforms may be embodied in systems, computer-implemented methods, apparatuses and/or software applications. The described platforms may provide a privacy and data protection client application for monitoring and analyzing privacy information. For example, the platform may be configured to scan an organization's various systems and applications in order to provide users with visibility into any personal information that may be stored in such data sources, any associated risks associated with storing such information and/or any usage activity relating to such information.

Embodiments of the privacy management platform may search for personal information across any number of local and/or cloud-based systems based on stored and/or learned rules. Once potential personal information is found, the platform may filter out false-positive personal information findings and correlate true-positive findings to specific data subjects via creation of personal information records during a correlation process. Accordingly, the platform may provide an inventory of such personal information that may be used by an organization to conduct privacy impact assessments.

In certain embodiments, the platform may employ sample scan techniques in combination with machine learning classifiers to provide a statistically-valid survey of the locations where specific types or attributes of personal information are stored within a scanned data source, while significantly reducing search times and strain on the system. In one such embodiment, the system may employ machine learning models to compare fields (i.e., columns) in one or more identity data sources known to contain personal information attribute values to fields in the scanned data source. More particularly, the machine learning models may analyze various features relating to field-to-field comparisons of each attribute field in one or more identity data sources to each scanned field in the scanned data source in order to determine whether a given attribute field in the identity data source contains the same type of personal information as a given scanned field in the scanned data source.

In one embodiment, the machine learning models may determine a confidence level for each attribute-field-to-scanned-field comparison and classify the scanned field as being associated with the attribute of the attribute field, based on the confidence level. As discussed herein, the confidence levels may be determined based on various features relating to values, metadata and/or summary statistics associated with one or more of: a given scanned field, personal information findings associated with the scanned field, and at least one attribute field of the identity data source. Generally, the privacy management platforms may be adapted to associate a personal information attribute corresponding to a specific attribute field of an identity data source with personal information records created from a given scanned field when the confidence level determined by the machine learning model for such attribute field and scanned field is greater than or equal to a minimum confidence threshold value.

Exemplary privacy platforms provide a client application to allow users to interrogate and analyze discovered personal information to determine privacy risk and/or usage compliance to various regulations and/or customer consent. Such applications may help organizations understand and compare data risk based on factors, such as but not limited to, data sensitivity, residency, security and/or access. For example, the platform may include: data risk scoring capabilities, which provide static and/or dynamic risk measurement; modular risk models from groups like the National Institute of Standards and Technology ("NIST"); enterprise customizability; and/or operational recommendations for mitigation and assignment workflow.

In certain embodiments, the platform may include natural language query capabilities and may additionally or alternatively provide reports (e.g., reports that can be shared with auditors and legal representatives). Accordingly, the platform may be adapted to receive a query including, for example, a specific value of a personal information attribute; determine a scanned data source and field within such scanned data source where personal information associated with the attribute is located (e.g., based on previously created, scanned, and classified personal information records associated with the scanned data source(s)); and search the field of the scanned data source in order to quickly locate the requested personal information.

In one embodiment, a computer-implemented method of finding and classifying personal information stored in one or more data sources is provided. The method may include receiving, by a computer, an identity data source including a first attribute field associated with first attribute values and a second attribute field associated with second attribute values, and receiving, by the computer, a scanned data source including a first scanned field associated with first scanned values. The method may also include determining, by the computer, a plurality of personal information findings including a first set of personal information findings determined by comparing the first attribute values to the first scanned values and a second set of personal information findings determined by comparing the second attribute values to the first scanned values. In certain embodiments, a plurality of personal information records may be created from some or all of the plurality of personal information findings, the plurality of personal information records including a first set of personal information records created from some or all of the first set of personal information findings, and a second set of personal information records created from some or all of the second set of personal information findings. The method may further include: calculating, by the computer, a first confidence level for the first scanned field and the first attribute field, said calculating based on a plurality of: a count of the first scanned values, a count of the first set of personal information findings, a count of the first set of personal information records, and a sum of the count of the first set of personal information records and a count of the second set of personal information records; calculating, by the computer, a second confidence level for the first scanned field and the second attribute field, said calculating based on a plurality of: the count of the first scanned values, a count of the second set of personal information findings, a count of the second set of personal information records, and the sum of the count of the first set of personal information records and the count of the second set of personal information records; upon determining that the first confidence level is greater than or equal to a minimum confidence threshold and that the second confidence level is less than the minimum confidence threshold, associating, by the computer, the first attribute field, but not the second attribute field, with the first scanned field in a report; and providing the report to a user device.

In certain cases, the scanned data source further includes a second scanned field associated with second scanned values. Additionally or alternatively, the plurality of personal information findings may further include a third set of personal information findings determined by comparing the first attribute values to the second scanned values; and a fourth set of personal information findings determined by comparing the second attribute values to the second scanned values. In some cases, the plurality of personal information records further includes a third set of personal information records created from some or all of the third set of personal information findings and a fourth set of personal information records created from some or all of the fourth set of personal information findings. In such cases, the method may also include: calculating, by the computer, a third confidence level for the second scanned field and the first attribute field, said calculating based on a plurality of: a count of the second scanned values, a count of the third set of personal information findings, a count of the third set of personal information records, and a sum of the count of the third set of personal information records and a count of the fourth set of personal information records; calculating, by the computer, a fourth confidence level for the second scanned field and the second attribute field, said calculating based on a plurality of: the count of the second scanned values, a count of the fourth set of personal information findings, a count of the fourth set of personal information records, and the sum of the count of the third set of personal information records and the count of the fourth set of personal information records; and, upon determining that the fourth confidence level is greater than or equal to the minimum confidence threshold and that the third confidence level is less than the minimum confidence threshold, associating the second attribute field, but not the first attribute field, with the second scanned field in the report.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5A-5B show an exemplary identity data source 502 and an exemplary scanned data source 503, respectively.

FIG. 9 shows exemplary training data that has been labeled and organized according to metadata.

FIG. 12 shows an exemplary personal information scan results review and modification screen according to an embodiment.

DETAILED DESCRIPTION

Figure 1:
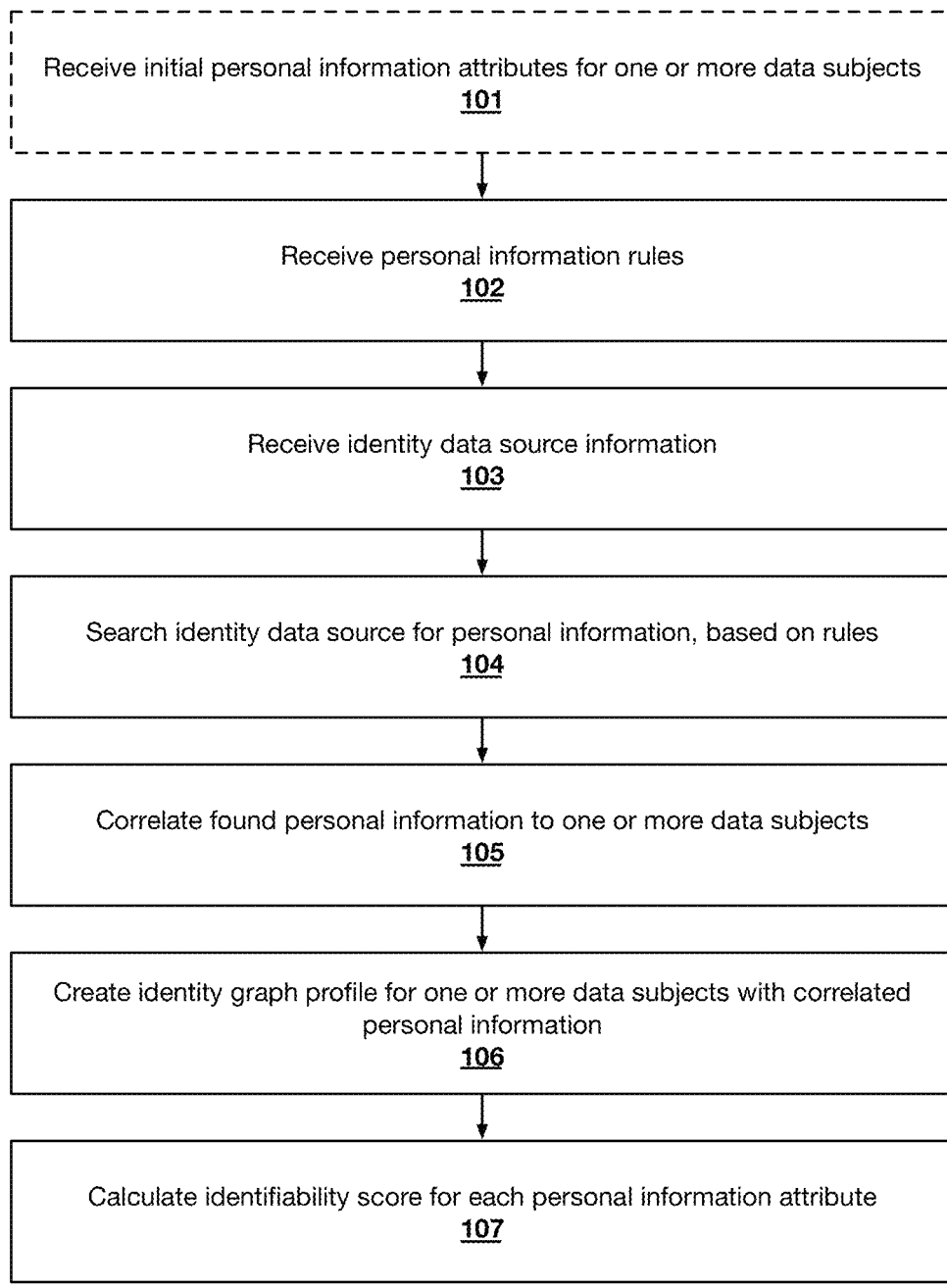
FIG. 1 shows an exemplary method of creating initial data subject profiles for an identity graph.

Various systems, computer-implemented methods, apparatuses and software applications are disclosed to allow organizations to discover, analyze, monitor and/or protect customer data and to manage customer privacy. The described embodiments may be adapted to scan an organization's various systems and applications in order to provide visibility into any sensitive customer data stored in such data sources, the risk associated with storing such data and/or any usage activity relating to such information.

The described embodiments may solve a number of issues that are not addressed by conventional data security systems, including but not limited to, assisting organizations to determine what data constitutes "personal information"; providing an organized inventory containing information pertaining to the location of personal information throughout an organization's systems (e.g., indexed by attribute and/or data subjects); allowing organizations to determine the residency of a data subject and to thereby understand the regulations with which it needs to comply; allowing organizations to determine which customers are impacted in the event of a breach or privacy violation; and/or providing functionality to allow organizations to comply with customer requests for deletion of personal information.

Exemplary embodiments may be configured to determine what data constitutes personal information; determine one or more data subjects for whom personal information should be monitored; discover personal information stored throughout any number of data sources (e.g., on-premise and/or remote systems and applications); analyze and process discovered personal information to create a personal information inventory indexed by attribute; and/or provide monitoring and visualization of privacy and data security risks.

As used herein, the term "personal information" may refer to any information or data that can be used on its own or with other information to identify, contact, or locate a single person, and/or to identify an individual in context. Such information may include any information that can be used to distinguish or trace an individual's identity. Specific, non-limiting examples of personal information types or "attributes" include, but are not limited to: name, home address, work address, email address, national identification number, social security number, passport number, driver's license number, age, gender, race, name of school attended, workplace name, grades, salary, job position, criminal record, web cookies, vehicle registration plate number, facial images or features, fingerprints, handwriting, IP address, credit card numbers, digital identity, login name, screen name, nickname, user handle, telephone number, date of birth, birthplace, and/or other genetic information.

Because of the versatility and power of modern re-identification algorithms, the absence of defined personal information does not mean that the remaining data does not identify individuals. While some attributes may be uniquely identifying on their own, any attribute can be identifying in combination with others. Accordingly, personal information may include any other information that is linked or linkable to an individual, such as medical information, personal health information ("PHI"), educational information, financial information, payment card industry ("PCI") data, employment information and/or other so-called "quasi-identifiers" or "pseudo-identifiers." Personal information may include information defined as "Personal Data" in Europe, or "Personally Identifiable Information," "PII" or "Sensitive Personal Information" (and other variants thereof) in the United States.

Referring to FIG. 1, an exemplary method of creating initial data subject profiles for an identity graph is illustrated. At an optional first step 101, initial personal information of one or more data subjects may be received by the system to create one or more data subject profiles. Such personal information (and resulting profiles) may correspond to users, customers, employees or any other person whose personal information is stored by the organization (collectively referred to herein as "data subjects"). Moreover, the initial personal information may be used as a learning set for the system to learn what personal information looks like in a specific environment. The initial personal information may be manually entered into the system by a user (e.g., via a client application) and/or may be included in a file that is uploaded to the system.

In one embodiment, the system may receive and/or determine one or more personal information rules 102. Such rules provide the logic required for the system to find personal information stored in various data sources. Personal information rules may include definition rules mapping to a unique identifier, a display name, country of resident attributes to be associated with specific personal information attributes (e.g., social security numbers or phone numbers) and/or combinations of such attributes. The personal information rules may further comprise one or more proximity rules governing searches within nearby locations of any found personal information attributes. For example, if a personal information attribute, such as a zip code, appears close to a social security number (e.g., in the same database row or within a certain number of characters), the system can correlate this proximity finding to a data subject associated with the given social security number.

In certain embodiments, the system may be preconfigured with a number of personal information rules. For example, the system may be deployed with personal information attribute rules corresponding to the definition of personal information specified by one or more organizations, such as the definition(s) given by NIST Special Publication 800-122 (US) and/or General Data Protection Regulation (EU), both of which are incorporated by reference herein in their entirety. Additionally or alternatively, the system may be adapted to allow users to manually create and/or update personal information rules.

As discussed in detail below, the system may be configured to automatically update existing personal information rules and/or to determine new rules. Exemplary systems may implement machine learning or similar techniques to iteratively and/or continuously create and update such rules.

At step 103, the system may be directed to identity data sources that are known to hold personal information of data subjects. Exemplary identity data sources may include, but are not limited to, structured databases, user directories (e.g., Lightweight Directory Access Protocol ("LDAP") directories), customer relationship management ("CRM") systems, human resources systems, ecommerce systems and/or others.

The system may determine and/or receive data source information associated with one or more identity data sources, such as a name, location, type and/or access information of the data source. In other embodiments, the system may receive data source information from a user. For example, a user may manually enter identity data source information into a client application and/or may upload a file containing such information. In another embodiment, the system may be configured to automatically discover one or more identity data sources, along with any corresponding data source information. The system may employ open source tools such as NMAP, CACTI, NAGIOS, ICINGA, and others to perform data source discovery and/or monitoring.

At step 104, the system may connect to one or more identity data sources and conduct a search for personal information contained therein, based on the stored personal information rules. As potential personal information is found in an identity data source, the system may create a personal information findings list of such information, including the value of each finding and/or metadata associated therewith, such as an associated attribute, the data source in which the personal information was found, the location where the personal information is located within the data source (e.g., collection, table, field, row, etc.), and/or a date when the personal information was found.

Once the system has searched the identity data source and created a personal information findings file, the system may attempt to correlate each of the findings to a data subject 105. The correlation process may leverage open source tools such as, for example, OPENDLP, WEKA, ORGANE, RAPIDMINER, etc. An exemplary correlation process is discussed in detail below with reference to FIG. 3.

At step 106, the system creates an initial identity graph data subject profile for any number of data subjects whose personal information is determined to be contained within the identity data sources. Generally, the system may create a unique profile for each data subject. And the system may associate any correlated personal information (and any corresponding metadata) with the relevant data subject profile via creation of personal information records. Collectively, the data subject profiles may be referred to herein as an "identity graph" and such identity graph may be stored and dynamically updated by the system.

In one embodiment, the personal information records associated with data subjects in the identity graph may store pointers to personal information attributes (e.g., a secure hash used for search), rather than the personal information itself for privacy reasons. Accordingly, the system may not extract personal information from the original location where it is found.

The identity graph may allow a company to identify a unique data subject to whom stored personal information belongs. This is important for a number of reasons, including: determining access rights to user information; understanding user and data residency based on the residency of the data subject; containing breaches by identifying the impacted data subjects in the case of breach; and/or reducing false positives by correlating and validating the personal information with the data subject.

At step 107, the system may calculate an attribute identifiability score for each personal information attribute added to the data subject profiles. This score reflects the uniqueness of a single personal information attribute and/or combinations of attributes in order to determine how strongly these attributes and combinations can be used to identify a particular data subject. The system may store the attribute identifiability scores and may associate the same with corresponding personal information records.

Figure 2:
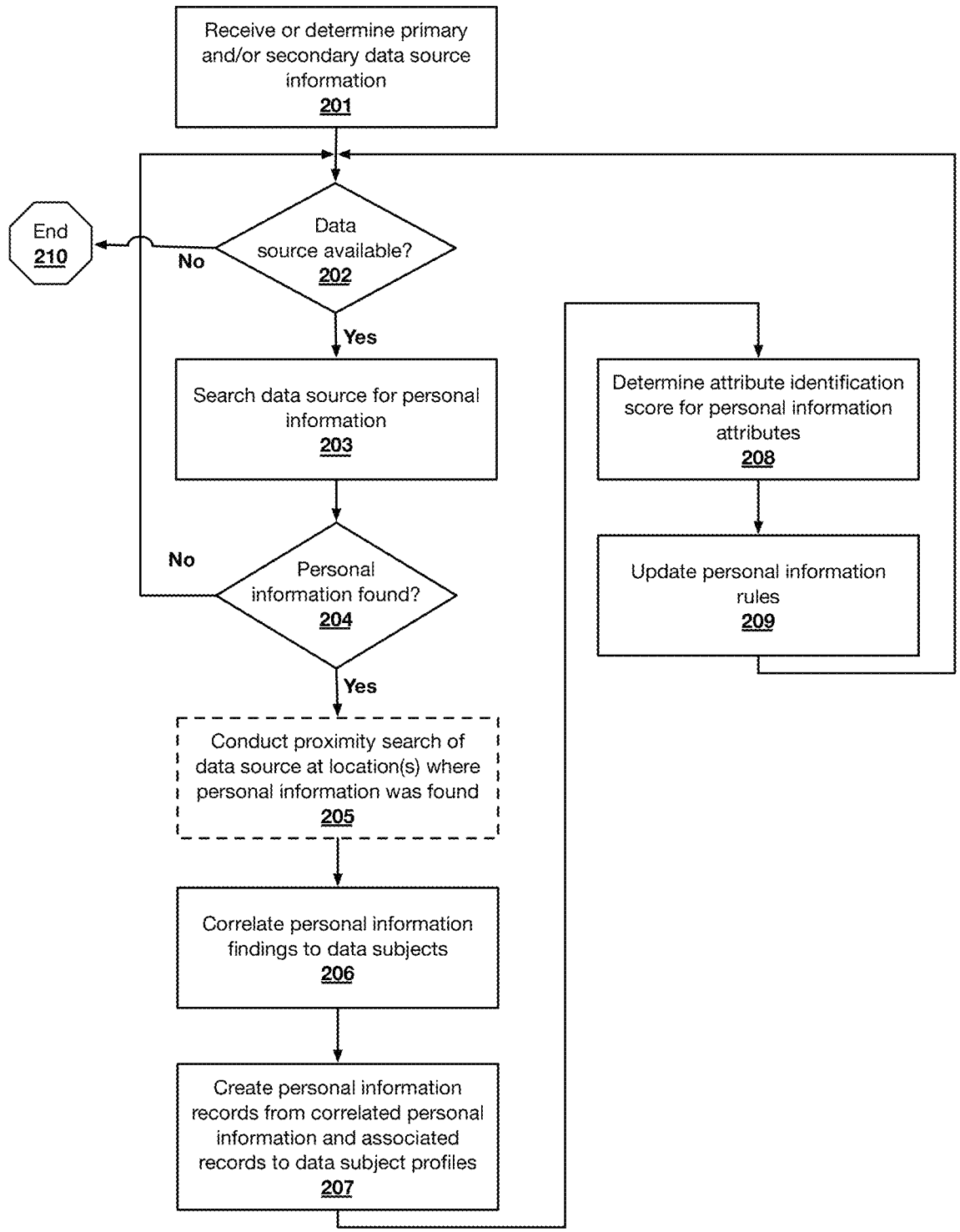
FIG. 2 shows an exemplary method of searching primary and secondary data sources for personal information to extend data subject profiles.

Referring to FIG. 2, an exemplary method of creating and updating data subject profiles for an identity graph is illustrated. Once the system is configured with initial data subject profiles (e.g., as described above with respect to FIG. 1), the system may update such profiles by conducting personal information searches of various primary and/or secondary data sources, such as databases, file shares and data protection solutions. Accordingly, the identity graph may be constructed to include an inventory comprising personal information records of all personal information stored by an organization across various systems and applications, and each record may include information such as, but not limited to: one or more stored attributes, a location of each attribute, application inventory, user store inventory, and/or all personal information attributes and application metadata (tags).

At a first step 201, the system receives and/or determines data source information corresponding to one or more primary and/or secondary data sources such that it may find, collect and/or determine the location of personal information within these data sources. Exemplary primary data sources may include, for example, structured databases (e.g., SQL), unstructured file shares, semi-structured Big Data and NoSQL repositories (e.g., Apache Hadoop, RDB and MongoDB), LDAP repositories, CRM systems (e.g., SALESFORCE), collaboration tools, cloud storage systems, text files and/or other internal or external applications. And exemplary secondary data sources may include, for example, DLP, data protection and/or data governance solutions (e.g., SYMANTEC, MCAFEE, VARONIS, IMPERVA, and IBM GUARDIUM) and/or log sources, such as but not limited to those of Security Information and Event Management ("SIEM") solutions (e.g., SPLUNK, HP ARCSIGHT, IBM QRADAR, etc.).

The system may be configured to automatically discover primary and/or secondary data sources, along with any data source information corresponding to such data sources. Additionally or alternatively, the system may receive data source information from a user via manual input or file upload.

At step 202 the system determines whether any discovered primary or secondary data sources have not been searched for personal information and/or whether such data sources have been updated since the last personal information search. If no such data source exists, the process may end 210. Otherwise, the process continues and the system searches a primary or secondary data source for personal information 203.

Generally, the system may search primary and secondary data sources for personal information attributes that have been previously associated with data subject profiles (i.e., that were added to the system by a user and/or that were found in identity data sources). The system may also search the primary and secondary data sources for additional personal information based on the personal information rules.

At step 204, if no personal information is found during a search 203, the process may return to step 202 to determine whether any additional primary or secondary data sources are available for searching.

Otherwise, when personal information attributes are found, a proximity of such attributes (i.e., the "original attributes") may be searched 205 in order to identify any additional personal information attributes that are located close to the original attributes (i.e., the "proximate attributes"). Such proximity searches may be based on one or more of the stored personal information proximity rules and/or the personal information rules. And the proximity searches may be employed to find proximate attributes for any number of data subjects, whether or not they currently exist in the system (i.e., they need not be part of the original identity sources).

As discussed above, as potential personal information is found in a data source, the system may add the finding to a personal information findings file along with any relevant metadata. Accordingly, the personal information findings file may comprise any number of personal information findings and metadata associated with such findings.

At step 206, the system attempts to correlate each of the personal information findings in the findings file to a data subject. As discussed in detail below with respect to FIG. 3, the system may create personal information records for each personal information finding that is successfully correlated to a data subject. The system may additionally or alternatively filter out certain findings before creating personal information records (e.g., false positives, findings correlated to multiple data subjects, findings with low attribute identifiability score, etc.).

In one embodiment, the system may employ the results of the correlation (e.g., the personal information records) to create, update, delete and/or replace information stored in the data subject profiles within the identity graph 207. For example, if a personal information record corresponds to an existing data subject, the record may be added to that data subject's profile. As another example, if a personal information record is correlated to a new data subject (i.e., a data subject who was not included in the identity data sources), a new profile may be created for the data subject and the personal information record may be added to the new profile.

At step 208, the system may determine an attribute identifiability score for one or more of the personal information attributes associated with the created personal information records. As discussed above, the system may store the attribute identifiability scores and associate the same with corresponding personal information records.

At step 209, the system may update the personal information rules, including personal information rules and/or proximity rules. After determining the identifiability score of an attribute or combination of attributes, highly identifiable attributes or combinations of attributes can be used again iteratively to initiate new searches recursively. This allows the system to discover additional data sets (i.e., nodes in the identity graph) that are associated with the same identities.

As an another example, the rules may be updated to search for personal information associated with any new data subjects discovered in the above steps. As yet another example, if a proximity search 205 results in the discovery of a proximate attribute, the location information of the proximate attribute may be used to update one or more personal information proximity rules so that subsequent searches may take advantage of this additional information. Generally, the location information may include, but is not limited to, the absolute location of the proximate attribute and/or the relative location of the proximate attribute to the original attribute. Additionally or alternatively, information relating to the type of proximate attribute may be used to update one or more attribute definition rules so that subsequent searches may look for this type of personal information.

In one embodiment, the system may employ machine learning techniques to iteratively update the personal information rules. One or more of the following machine learning algorithms may be employed: clustering, logistic regression, decision tree learning, Bayesian networks, random forests, support vector machine ("SVM"), artificial neural networks and any other machine learning algorithm.

It will be appreciated that various machine learning algorithms provide different results for different types of data—structured or unstructured, text, documents, geolocation, images, etc. Moreover, the type and/or amount of stored data may vary widely among organizations. Accordingly, it may be preferable to continuously compare the results obtained by different machine learning algorithms on various data sources within a single organization and/or across multiple organizations to determine variance. To that end, the system may test training data and validate a plurality of algorithms to select the most effective for a particular data set and/or organization.

One or more of the above algorithms may be separately trained for each organization that uses the platform by employing organization-specific training data to build one or more organization-specific personal information classification functions comprising personal information attribute rules. An effective personal information classification function may then be employed for a specific organization, based on that organization's requirements or preferences.

Machine learning may also be employed to classify any proximate attributes found during a proximity search. Such classification may be based on whether proximate attributes are uniquely correlated to the data subject to whom the original attribute is correlated (i.e., based on identifiability scores of proximate attributes).

In one embodiment the system may employ a semi-supervised active learning process.

For example, the system may use the following information as training data to train a machine learning algorithm to identify personal information (e.g., to create and/or update personal information rules): a first proximate attribute located within the proximity of an original attribute (e.g., collection of rows in a database or paragraphs in text files); the original attribute; and/or any other information associated with the data subject to whom the original attribute is correlated. The trained algorithm may then be used to determine whether each additional proximate attribute located within a proximity of the original attribute should be correlated to the data subject with whom the original attribute is associated.

In any event, once the personal information rules have been updated in step 209, the system may return to step 202 to determine whether any connected primary or secondary data sources have not been searched for personal information and/or whether such data sources have been updated since the last personal information search. If no such data source exists, the process ends 210. Otherwise, the process continues to search the next primary or secondary data source for personal information 203.

Figure 3:
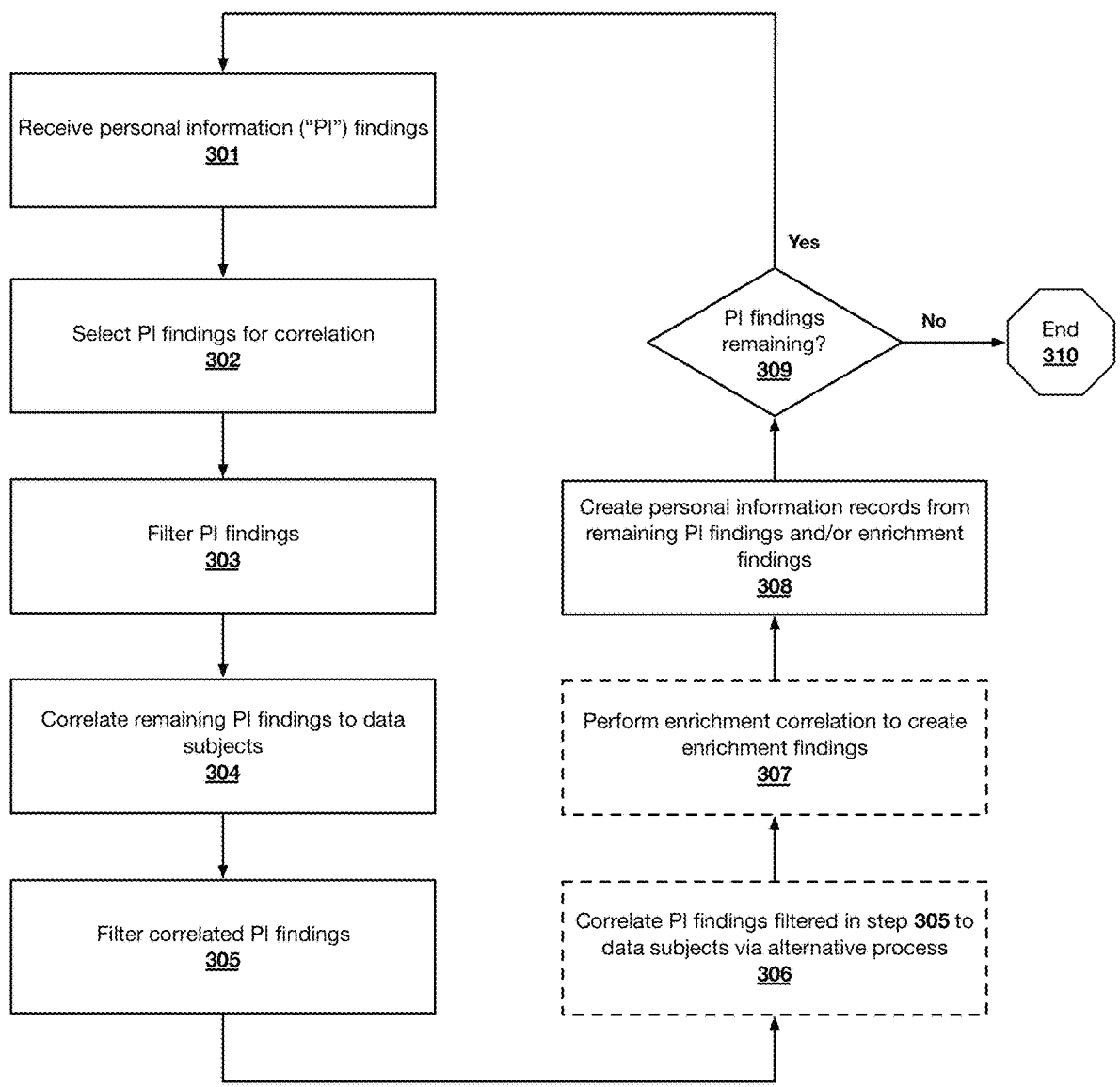
FIG. 3 shows an exemplary method of correlating personal information findings to data subject profiles.

Referring to FIG. 3 an exemplary method of correlating potential personal information found in a data source (i.e., personal information findings) to data subject profiles is illustrated. At step 301, the system receives one or more personal information findings for correlation. Such findings may be determined via a sample search (see FIG. 4, below) or full search of an initial data source, a primary data source and/or a secondary data source.

In certain embodiments, all of the personal information findings associated with a scan of a data source may be stored in a personal information findings file or collection. Each of the findings may comprise metadata associated with the found potential personal information, including one or more of: an attribute type, a value (which may be hashed for privacy reasons), a scan ID, data source information corresponding to the data source where the personal information is stored (e.g., name, type, location, access credentials, etc.) and/or location information corresponding to a location within the data source where the personal information is stored (e.g., collection, table, field, row, etc.).

At step 302, the system selects a number of the available personal information findings to correlate. Correlation may be handled as a bulk process and the system may select all available findings, or may select a subset of such findings based on a user-configurable or system-determined variable.

At step 303, the system may filter out personal information findings associated with data values that should not be classified as personal information. In one embodiment, the system may filter out findings that are associated with a value that occurs many times within a given field (i.e., column) in the data source that itself only contains a small number of distinct values.

For example, the system may filter out findings associated with a given value found in a data source field when: (1) the number of distinct values in the field divided by the total number of personal information findings found within the field is greater than a predetermined, configurable maximum (e.g., 0.001); and/or (2) the number of occurrences of the value in the field divided by the total number of personal information findings found within the field is greater than a predetermined, configurable maximum (e.g., 0.1).

As another example, the system may filter out findings associated with a given value found in a data source field when: (1) the standard deviation of occurrences of the given value in the field ("stdDevPop") is greater than the average number of occurrences of all distinct values in the field; (2) the maximum number of occurrences of any distinct value in the field divided by the stdDevPop is greater than a predetermined, configurable maximum (e.g., 10); and/or (3) the number of occurrences of the given value in the field is greater than the average number of occurrences of all distinct values in the field plus twice the stdDevPop.

It will be appreciated that the above-described filtering techniques are merely exemplary and the system may employ any number of filtering processes to ensure that personal information records are not created for false-positive findings.

At step 304, the system attempts to correlate each of the remaining personal information findings (i.e., the findings that were not filtered out in step 303) to a data subject in the identity graph. In one embodiment, the system determines each of the data subject profiles to which a given finding's value maps and the total number such matches by, for example, comparing the finding's value to each of the personal information values stored in the identity graph (i.e., each value associated with each of the stored data subject profiles). Accordingly, it will be appreciated that a personal information finding may be said to "correlate" to a data subject profile when the value associated with the finding matches an attribute value associated with the data subject profile.

In one embodiment, the system may discard any personal information findings that cannot be mapped to any data subject attributes in step 304.

At step 305, the system may perform additional filtering on the personal information findings correlated to data subjects in step 304. For example, the system may filter findings that correlate to multiple data subject profiles and/or that only map to data subject attributes that fail to meet certain attribute identifiability criteria.

In one embodiment, the system may filter out personal information findings based on an attribute identifiability score of the attribute associated with the finding. Generally, the attribute identifiability score reflects the uniqueness of a single personal information attribute and/or a combination of attributes. This score may be determined for a given attribute by, for example, calculating the average number of data subjects to which the values associated with the attribute may be correlated. As an example, the highest possible attribute identifiability score of 1 may be assigned to an attribute that includes values that, on average, correlate to a single data subject. As another example, an attribute identifiability score of 0.5 may be assigned to an attribute that includes values that, on average, correlate to two data subjects.

Accordingly, the system may filter out personal information findings that are associated with only attributes having a "low" attribute identifiability score. For example, the system may filer out findings associated with only attributes having an attribute identifiability score of less than a minimum identifiability threshold (e.g., about 0.5). Such threshold may be manually entered by a user and/or may be automatically determined by the system.

Additionally, the system may filter out findings that correlate to more than a predetermined maximum number of data subject profiles. In one embodiment, the predetermined maximum number of data subjects may be manually entered into the system by a user. In another embodiment, the system may automatically filter out such findings by: (1) selecting an attribute with the lowest, valid attribute identifiability score (i.e., a score above an attribute identifiability threshold) and (2) calculating the sum of the average number of data subjects associated with the distinct value of the selected attribute plus the standard deviation of the average.

At optional step 306, the system may attempt to correlate each of the personal information findings that were filtered out at step 305 to a data subject profile via an alternative correlation process.

In one embodiment, the system may retrieve stored personal information records that were previously created from the data source associated with a given finding and within a proximity of the location where the finding was found (e.g., within the same table row in RDB or within the same document in MongoDB). The system may also identify all of the data subject profiles that are associated with any personal information found in the proximity.

The system may then attempt to correlate the given finding to a data subject by comparing the finding's value to: (1) each of the values contained in the retrieved personal information record(s) and (2) each of the values associated with each of the identified data subjects. The system may discard any personal information findings that cannot be mapped to any data subject profiles in step 306.

At optional step 307, the system may employ an enrichment correlation process. In one embodiment, the enrichment correlation process may be performed only when the personal information findings are associated with a structured data source. Additionally, the enrichment correlation may be performed only when the proportion between (1) the number of proximities in the data source (e.g., records in RDB, documents in MongoDB) with personal information records and (2) the total number of proximities in the data source (the "Proportion") is greater than a predetermined minimum value (e.g., 0.99). In one embodiment, the minimum value may be equal to 1−enrich_identify_range.

First, the system may determine a best field (i.e., column) in the data source corresponding to the field with: (1) the most personal information records and (2) the highest proportion between data subjects and personal information findings. The best field may be selected from among all fields in the data source where: (1) the number of corresponding personal information records is greater than half of the total number of records in the column; (2) the average number of data subjects matched to each corresponding personal information finding is less than 1+enrich_identify_range; and (3) the average number of data subjects matched to each corresponding proximity is less than 1+enrich_identify_range.

The system may then identify each of the fields in the data source for which the number of corresponding personal information records is less than half of the total number of records ("enrichment fields"). Upon identifying the enrichment fields, the system may create enrichment findings corresponding to each of the values stored in each enrichment field.

In one embodiment, the system may combine any enrichment finding with a personal information finding associated with the same distinct value and field. The system may also filter out enrichment findings based on uniqueness or identifiability. For example, the system may filter out enrichment findings for which the proportion between (1) the number of distinct values in the corresponding enrichment field and (2) the total number of records in the enrichment field is less than an a minimum value (e.g., an attribute identifiability threshold).

At step 308, the system may create a personal information record for each of the remaining personal information findings and/or enrichment findings correlated to a data subject. The remaining personal information findings may include (1) findings correlated to a data subject in step 304 and not filtered out in step 305; and (2) findings correlated to a data subject in step 306. It will be appreciated that each of the personal information records may include any of the data stored in the corresponding personal information finding and/or any of the information or metadata determined by the system in one or more of the above steps.

In one embodiment, the system may create personal information records for each of the remaining enrichment findings by joining an enrichment finding with personal information records on proximity where the field name is equal to the best field and determining the data subject details from the matching personal information record.

At step 309, the system determines whether there are any additional personal information findings for which personal information records have not been created (or that have not been filtered out). If one or more of such findings exist, the process may return to step 302 to select additional findings. Otherwise, the process may end 310.

It will be appreciated that, in some embodiments, the system may skip any or all of processing steps 303 through 307. For example, the system may simply create a personal information record 307 for each of the personal information findings selected in step 302. This may preferably be employed when the personal information findings are associated with an identity data source.

Figure 4:
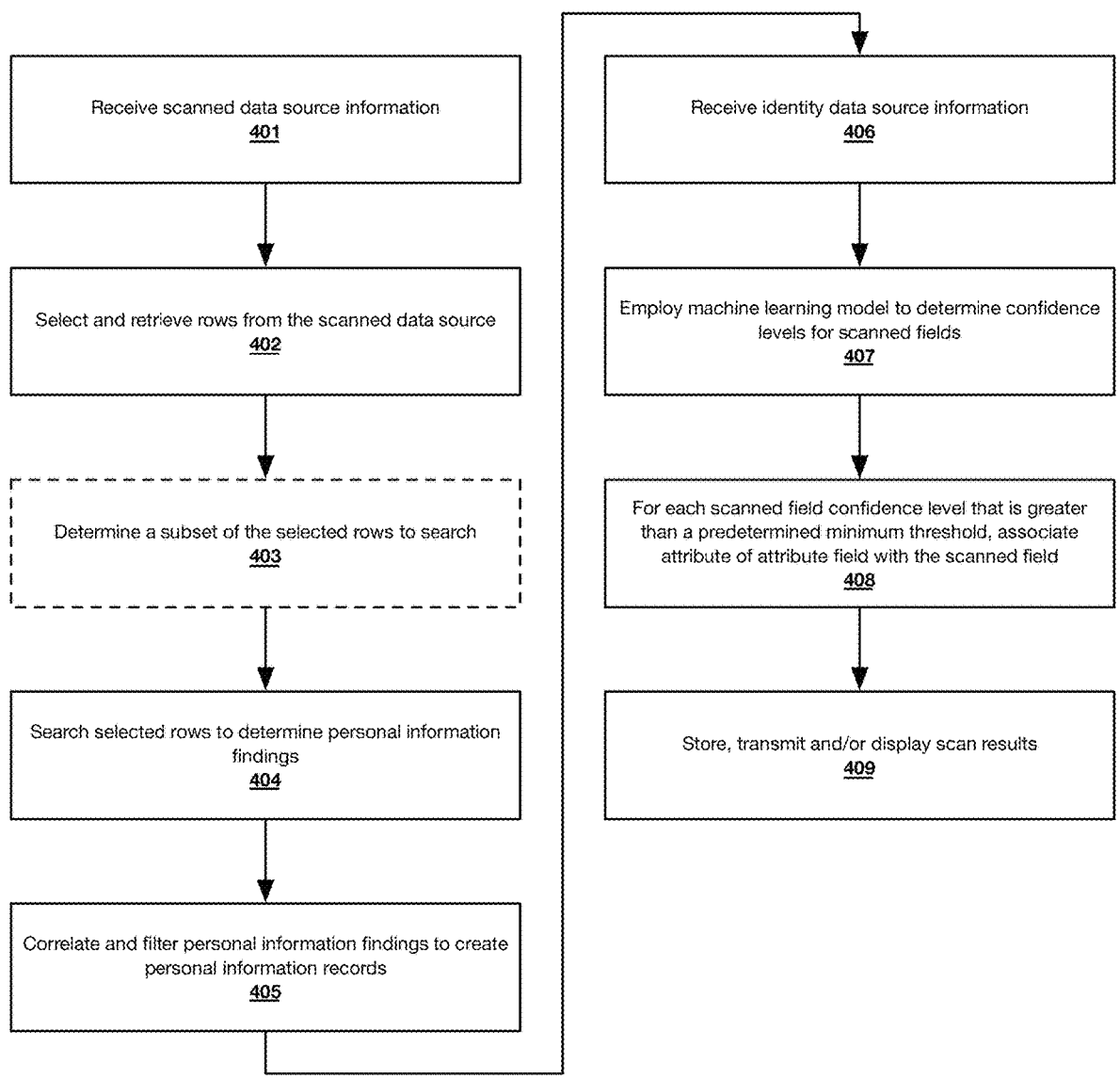
FIG. 4 shows an exemplary sample scan method that employs a machine learning model to classify fields in a scanned data source according to personal information attributes.

Referring to FIG. 4, an exemplary sample scan method is illustrated. In certain embodiments, the system may employ one or more sampling methods to scan a configurable subset (or sample) of the data present in one or more data sources. Such sample scan techniques may provide a statistically-valid survey of the locations where personal information is stored, while significantly reducing search times and strain on the system.

Scanning data sources for personal information can be a lengthy operation, as a typical search includes the following steps: scanning all data present in a given data source (e.g., a table, collection, and/or file), fetching the data into a scanner, and then determining whether the data constitutes personal information (e.g., by checking the data against a personal information index). Moreover, a given search may discover a large number of personal information findings in cases where the searched data source is densely populated with personal information (e.g., several fields of personal information in each database row). Such a situation may adversely impact the speed of a scan process, because each personal information finding may need to be fetched and correlated, even if the search ultimately results in the creation of only a small number of new personal information records.

While some scenarios require a comprehensive search across all data sources in order to determine a complete description of all personal information belonging to each and every data subject in a system, this is not always required. Generally, exemplary sample scan techniques may search a subset of the data stored in one or more data sources across an organization. Such techniques are designed to maximize the probability of locating personal information, while maintaining a reasonably small sample size in order to reduce the amount of data that needs to be fetched and processed and the total time required to perform the search.

As shown in FIG. 4, at a first step 401, the system receives data source information corresponding to a data source on which a sample scan is to be performed (i.e., a scanned data source). As discussed above, the data source information may be received from a user and/or may be automatically determined by the system via a discovery process.

At step 402, the system connects to scanned data source in order to retrieve data contained in any number of rows therein. In one embodiment the number of rows to retrieve is predetermined (e.g., 1,000,000). In another embodiment, the number may be calculated by the system based on the total number of rows in the database. In certain cases, the system may randomly select the rows.

At optional step 403, the system may select a subset of the retrieved rows to search. In one embodiment, the subset may comprise from about 1% to about 25% of the total number of retrieved rows (e.g., about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23% 24% or about 25% of the total number of retrieved rows). In one embodiment, the selection of a subset of the retrieved rows may comprise random selection. In another embodiment, the subset may be selected by skipping a predetermined, calculated, or variable number of rows after each selected row until the desired number of retrieved rows are selected. Additionally or alternatively, any number of queries comprising skip and/or limit flags may be employed to determine which records to select within retrieved records of a data source. It will be appreciated that step 403 is optional; in some embodiments, the system may utilize all of the rows selected at step 402.

At step 404, the system searches the selected rows and creates personal information findings, as described above with respect to FIG. 2. At step 405, the system then performs a correlation process on the personal information findings to determine whether personal information exists in the scanned data source. As discussed above with respect to FIG. 3, the correlation process filters out false-positive findings and results in the creation of personal information records for each of the true-positive findings that match known attribute values stored in the system.

At step 406, the system receives data source information corresponding to an identity data source that is known to hold personal information of data subjects and connects to the identity data source to receive data contained therein. Like the scanned data source information, the identity data source information may be received from a user and/or may be automatically determined by the system via a discovery process.

At step 407 the system employs a machine learning model to determine confidence levels indicating how closely each field in the identity data source (each "attribute field") corresponds to each field in the scanned data source (each "scanned field"). As discussed in detail below, each of the determined confidence levels generally relates to how closely a given attribute field maps, matches or otherwise corresponds to a given scanned field. Accordingly, the determined confidence levels may be based on a heuristic calculation that takes into account a number of features relating to the identifiability, correlation, distinct value, and/or distinct classification of one or more personal information findings. And the confidence level may range from a minimum (indicating poor accuracy) to a maximum (indicating high accuracy) such that it represents a degree of certainty regarding a match between an attribute field and a scanned field.

To facilitate discussion of the classification process shown in FIG. 4, reference is made to the exemplary identity data source 502 and exemplary scanned data source 503 illustrated in FIGS. 5A-5B. As shown, an identity data source 502 may comprise one or more tables having any number of attribute fields (i.e., columns 540, 550, 560, and 570), wherein each attribute field is associated with a field name, a personal information attribute and a plurality of values (i.e., rows). For example, attribute field 540 is associated with a field name of "UserID," a user ID attribute, and a plurality of rows containing user ID values (e.g., value 541). As another example, attribute field 550 is associated with a field name of "FullName," a name attribute, and a plurality of rows containing name values (e.g., value 551).

It will be appreciated that the values within a single row of the identity data source 502 will typically be associated with a single entity. For example, values 541, 551, 561, and 571 are each associated with a single entity (i.e., a data subject associated with a name attribute value 551 of "John Smith"). Accordingly, an identity data source 502 may store a plurality of personal information attribute values for each of a plurality of entities.

A scanned data source 503 may similarly comprise one or more tables having any number of scanned fields (i.e., columns 510, 520, and 530), wherein each field is associated with a field name and one or more values (i.e., rows). For example, scanned field 510 is associated with a field name of "User" and a plurality of values (e.g., value 541). As another example, scanned field 520 is associated with a field name of "Promo" and a plurality of values (e.g., value 521). And, like the identity data source table 502, all of the values within a given row of the scanned data source table 503 will typically be associated with a particular entity.

It will be appreciated that, although the system "knows" that each of the attribute fields within the identity data source 502 contains values associated with a specific personal information attribute, the nature of the values contained within each of the scanned fields in the scanned data source 503 is unknown. Accordingly, the system may employ the machine learning models to analyze various features relating to attribute fields and scanned fields in order to predict whether a given attribute field and a given scanned field both contain values relating to the same personal information attribute (e.g., user ID, name, language, social security number, phone number, etc.).

Generally, the features employed by the machine learning models may relate to one or more of: the values contained in the selected rows of the scanned data source, metadata associated with fields in the scanned data source, values contained in the identity data source, metadata associated with fields in the identity data source, information associated with personal information findings determined from the scanned data source and the identity data source, and/or information associated with personal information records created from such findings. Exemplary features are discussed in detail below.

In one embodiment, the machine learning model may utilize one or more features relating to a field values count. The field values count may be defined as the total number of values (i.e., total number of rows) in the current scanned field. For example, scanned field 510 in the scanned data source 503 contains 9 rows and is therefore associated with a field values count of 9. As another example, scanned field 520 is also associated with a field values count of 9 because it contains 9 total values.

In another embodiment, the machine learning model may employ one or more features relating to a field findings count. The field findings count may be defined as the number of personal information findings of the current attribute field in the current scanned field. For example, the field findings count for attribute field 540 and scanned field 510 is 7, as the fields include the following findings: values 541 and 542 match value 512, value 543 matches value 513, value 544 matches value 514, value 545 matches value 515, value 546 matches value 516, value 547 matches value 517, and value 548 matches value 518. As another example, the field findings count for attribute field 550 and scanned field 510 is equal to 4, as the fields include findings between value 556 and value 511, value 556 and value 516, value 557 and value 511, and value 557 and value 516.

It will be appreciated that a finding may be determined when a value in the attribute field matches a value in the scanned field. The system may utilize various criteria to determine such matches. For example, the system may require that the attribute field value exactly matches the scanned field value. As another example, the system may require that the attribute field value matches only a substring of the scanned field value.

In one embodiment, the system may perform any number of processing steps to clean, normalize and/or standardize the values before determining whether they match. For example, the system may remove non-alphanumeric characters from the values (e.g., spaces, periods, dashes, parentheses, etc.) before determining whether they match. As another example, the system may modify text formatting (e.g., convert text to upper- or lowercase, convert subscript or superscript, etc.), round numbers, and/or convert values from one unit to another.

In other embodiments, the system may utilize natural language processing and/or various string similarity algorithms to determine a match between an attribute field value and a scanned field value. In such cases, the system may determine a match when, for example, a similarity score calculated for the attribute field value and the scanned field value is greater than or equal to a minimum threshold value.

In one embodiment, the machine learning model may employ one or more features relating to a field unique findings count. The field unique findings count may be defined as the number of unique values associated with the personal information findings of the current attribute field in the current scanned field. For example, the field unique findings count for attribute field 570 and scanned field 520 is 2, as the scanned field only contains two unique values (e.g., value 521 and value 522). And as another example, the field unique findings count for attribute field 570 and scanned field 530 is equal to 3.

In another embodiment, the model may employ one or more features relating to an attribute records count. The attribute records count may be defined as the number of personal information records created from the personal information findings determined for a current attribute field and a current scanned field. As discussed above, the system may only create a personal information record for findings that are not filtered out during the correlation process.

Taking attribute field 540 and scanned field 510 as an example, the system may create the 7 personal information findings discussed above. Assuming the User ID attribute associated with attribute field 540 is highly identifiable (i.e., the attribute is associated with an attribute identifiability score greater than or equal to a minimum value), it is likely that each of the findings would pass the correlation process and personal information records would be created for values 541-548. Accordingly, the attribute records count would be equal to 8 in this case.

As another example, take attribute field 550 and scanned field 510. As discussed above, the field findings count for these fields is equal to 3. However, each of values 556, 557 and 511 reflects a data entry error or other noise and, thus, all 3 findings for these values would typically be filtered out during the correlation process. As a result, the system would not create personal information records for these findings and the attribute records count would be equal to 0 in this case.

In one embodiment, the machine learning model may employ one or more features relating to a distinct IDs count. The distinct IDs count may be defined as the number of personal information records created from personal information findings for unique values of a current attribute field and a scanned source field. It will be appreciated that the distinct IDs count is similar to the field unique findings count, except that the former counts personal information records and the latter counts personal information findings.

Taking attribute field 540 and scanned field 510 as an example, values 541 and 542 in the attribute field 540 both match value 512 in scanned field 510; and each of values 543-548 in the attribute field match one value in the scanned field (513-518, respectively). Assuming that personal information records are created for all of these findings, the number of distinct IDs will be equal to 7, as value 541 and 542 are identical and are only counted once.

In yet another embodiment, the machine learning model may employ one or more features relating to a field record count. The field record count may be defined as the number of personal information records created from personal information findings determined for all attribute fields across all identity data sources and a current scanned field.

As an example, the field record count may be determined for all the attribute fields (e.g., 540, 550, 560, 570) of the identity data source 502 and one of the scanned fields (e.g., 510) of the scanned data source 503. In this case, records are created for the following matches: value 541 in attribute field 540 matches to value 512 in scanned field 510; value 542 in attribute field 540 matches to value 512 in the scanned field; value 543 in attribute field 540 matches to value 513 in the scanned field; value 544 in attribute field 540 matches to value 514 in the scanned field; value 545 in attribute field 540 matches to value 515 in the scanned field; value 546 in attribute field 540 matches to value 516 in the scanned field; value 547 in attribute field 540 matches to value 517 in the scanned field; and value 548 in attribute field 540 matches to value 518 in the scanned field. Although values 556 and 557 in attribute field 550 and value 579 in attribute field 570 each match to values 511 and 516 in the scanned field 510, records are not created for these matches because they are not highly identifiable and are not in proximity to a highly identifiable attribute. Accordingly, the field record count for all the attribute fields (540, 550, 560, 570) of the identity data source 502 and scanned field 510 of the scanned data source 503 is equal to 8.

It should be noted that, this feature may be used in the calculation of the ratio between attribute records count and field records count (discussed below). A higher value of this ratio indicates a higher degree of certainty that a certain attribute field corresponds to a certain scanned field and, therefore, the attribute associated with the attribute field may be associated with scanned field. On the other hand, a lower value may indicate that the attribute field does not correspond to the source field; rather, a different attribute field in the identity data source may better match to the scanned field.

In another embodiment, the machine learning model may employ one or more features relating to a maximum attribute records table count ("MARTC"). MARTC may be defined as the number of personal information records created from personal information findings determined for one attribute field and all scanned fields within a scanned data source table.

As an example, the field record count may be determined for attribute field 540 of the identity data source 502 and all of the scanned fields (e.g., 510, 520, 530) of the scanned data source 503. In this case: values 541 and 542 in attribute field 540 match to value 512 in scanned field 510; and each of values 543-548 in the attribute field 540 matches to one value (513-518) in scanned field 510. None of the values in attribute field 540 matches a value in scanned field 520 or 530. Accordingly, the MARTC for attribute field 540 and all of the scanned fields (510, 520, 530) is equal to 8.

In one embodiment, the machine learning model may employ one or more features relating to an attribute ratio per scanned source. This feature may be calculated by dividing the attribute records count by the MARTC. For example, the attribute ratio per scanned source for attribute field 540 and scanned field 510 is: 8/8=1.

It will be appreciated that a higher value for the attribute ratio per scanned source feature indicates a higher degree of certainty that a particular attribute field corresponds to a particular scanned field and, therefore, the attribute associated with the attribute field may also be associated with the scanned field. On the other hand, a lower value may indicate that the attribute field does not correspond to the source field; rather, a different attribute field in the identity data source may better match to the scanned field.

In certain embodiments, the machine learning models may employ various features relating a count of sure matches, a count of full matches, and/or a count of sure and full matches. Generally, when an attribute field is associated with a highly identifiable attribute, a match between a value in the attribute field and a value in a scanned field may be referred to a "sure match." As discussed above, an attribute field may be considered highly identifiable when values in the field are each correlated with two or less unique data subject profiles. In other words, an attribute field associated with an attribute identifiability score of at least 0.5 will be considered highly identifiable and values in a scanned field that can be matched to such attribute field values will be considered sure matches.

For example, assume that attribute field 540 in the identity data source 502 has an identifiability score of at least 0.5. In such case, each match of a value in the attribute field 540 (e.g., value 543) to a value in a scanned field (e.g., value 513 in scanned field 510) will be considered a sure match (assuming other criteria are met as detailed above). As another example, assuming that attribute field 550 has an identifiability score of less than 0.5, any match of a value in the attribute field to a value in any scanned field will not be considered a sure match.

A "full match" denotes a scenario where an attribute field value exactly matches a scanned field value. For example, value 543 in attribute field 540 exactly matches value 513 in scanned field 510 and would be counted as a full match. As another example, values 556 and 557 in attribute field 550 only partially match value 516 in scanned field 510 and would not be counted as a full match.

A "sure and full match" refers to a case where an attribute field value is both a sure match and a full match to a scanned field value. In the above examples, value 513 in scanned field 510 is a sure match and a full match to value 543 in attribute field 540; therefore, it is counted as a sure match, a full match, and a sure and full match. However, while value 579 in attribute field 570 is a full match to value 522 in scanned field 520, this is not a sure match because the attribute field 570 is not considered highly identifiable; therefore, it is not counted as a sure and full match.

Finally, the machine learning models may employ one or more features relating to name similarity. Generally, name similarity refers to a measure of the similarity between a name of a specific attribute field and a name of a specific scanned field. Although the system may employ any number of algorithms to determine name similarity, one preferred algorithm is Levenshtein Distance ("LD"), which relates to the number of deletions, insertions and/or substitutions required to transform a scanned field name to an attribute field name (or vice versa). As an example, the LD of attribute field 540 (i.e., the string, "UserID") and scanned field 510 (i.e., the string, "User") is about 0.7. As another example, the LD of the attribute field 570 and scanned field 520 is 1, as both fields are associated with a field name of "Promo."

Table 1, below, shows a list of predictive features, ranked according to importance, that may be employed by the machine learning models to determine confidence levels for attribute fields and scanned fields. It will be appreciated that the listed features are exemplary and various machine learning models utilized by the privacy management platforms may employ additional or alternative features.

TABLE 1

Ranked Machine Learning Features

| Rank | Feature |
| --- | --- |
| 1 | field record count/field findings count |
| 2 | attribute records count/field record count |
| 3 | sure matches count |
| 4 | attribute records count/field findings count |
| 5 | distinct IDs/attribute records count |
| 6 | field findings count/field values count |
| 7 | full matches count |
| 8 | sure matches count/attribute records count |
| 9 | sure and full matches count |
| 10 | attribute records count/MARTC |
| 11 | sure and full matches count/attribute records count |
| 12 | full matches count/attribute records count |
| 13 | name similarity |

It will be appreciated that the system may employ one or more machine learning algorithms to determine confidence levels. Exemplary algorithms include, but are not limited to: random forests, clustering, logistic regression, decision tree learning, Bayesian networks, SVMs, artificial neural networks and others. One or more of these algorithms may be separately trained for each organization that uses the platform by employing organization-specific training data to build one or more organization-specific personal information classification functions comprising personal information attribute rules.

It will be further appreciated that various machine learning algorithms provide different results for different types of data (e.g., structured or unstructured, text, documents, geo-location, images, etc.). Moreover, the type and/or amount of stored data may vary widely among organizations. Accordingly, it may be preferable to continuously compare the results obtained by different machine learning algorithms on various data sources within a single organization and/or across multiple organizations to determine variance. To that end, the system may test training data and validate a plurality of algorithms to select the most effective for a particular data set and/or organization.

As shown in FIG. 4, the system determines whether each of the confidence levels calculated by the machine learning model is greater than or equal to a minimum confidence threshold value at step 408. For each case where the confidence level is greater than the threshold, the system may associate the personal information attribute of the attribute field for which the confidence level was determined with the corresponding scanned field.

At step 409, the system stores, transmits and/or displays the results of the scan, including location information corresponding to one or more locations in the scanned data source where personal information has been confirmed and/or classified according to attribute (e.g., field(s) and/or row(s) within such fields). In one embodiment, the scan results may include metadata, such as but not limited to: scanned data source information corresponding to the tables that were scanned, the number of rows scanned, the specific rows scanned, the number of findings detected, the number of personal information records created from such findings, field-to-field confidence levels, scanned field attribute classifications, and/or other information.

The scan results may be employed for any number of potential use cases, as such results provide a basis for a quick analysis of personal information instances in target systems. As one example, scan results may provide strong value (and fast turnaround times) to an organization undergoing data center migration, where data subject correlation is not required. As another example, an initial sample scan may be employed to determine one or more locations within a data source where personal information is stored (e.g., tables/collections and/or specific columns within such objects).

In one embodiment, the sample scan results may be employed to run full scans only on data sources and/or locations within data sources that are determined to hold personal information. For example, upon receiving a search or query including a request to retrieve requested personal information associated with the attribute, the system may determine which personal information records are associated with the attribute and search the scanned data source field(s) corresponding to such records in order to quickly locate the requested personal information. This may significantly reduce search times in situations where a data source comprises a large number of tables, but only a few of those tables contain personal information. By employing sample scans, the system may run full scans in a "just-in-time" fashion (e.g., when one or more users request that their data be removed from the system).

In another embodiment, the system may transmit or display some or all of the scan results to a user via one or more client applications or application programming interfaces ("APIs"). For example, the system may display each of the personal information findings, metadata associated with such findings, confidence levels determined for various fields, and/or a label or other indicator to indicate whether the system has classified each of the field according to personal information attribute. In cases where an entry is classified as personal information, the system may further display a personal information record created for one or more data subjects to whom the entry has been correlated.

Generally, the disclosed embodiments may determine confidence levels for any number of scanned fields. In one embodiment, the system may calculate confidence levels for all scanned fields in the scanned data source across all attribute fields in all identity data source tables. For example, the system may determine a first confidence level for a first attribute field (e.g., attribute field 540) and a first scanned field (e.g., scanned field 510); then the system may determine a second confidence level for a second attribute field (e.g., attribute field 550) and the first scanned field; then the system may determine a third confidence level for a third attribute field (e.g., attribute field 560) and the first scanned field; and then the system may determine a fourth confidence level for a fourth attribute field (e.g., attribute field 570) and the first scanned field. When more than one identity data source table is available (not shown), the process may continue to calculate additional confidence levels for the first scanned field and each of the attribute fields in the additional identity data source tables. The above process may then be repeated for each additional scanned field (e.g., scanned field 520 and then scanned field 530) in the scanned data source table 503.

In an alternative embodiment, the system may only calculate confidence levels for a particular scanned field until a confidence level greater than a minimum threshold is determined. For example, the system may determine a first confidence level for a first attribute field (e.g., attribute field 540) and a first scanned field (e.g., scanned field 510); the system may determine that the first confidence level is greater than or equal to a minimum threshold; and then, rather than calculating a second confidence level for a second attribute field (e.g., attribute field 550) and the first scanned field, the system may move on to calculate a second confidence level for the first attribute field and a second scanned field (e.g., scanned field 520). The above process may then be repeated for each additional scanned field (e.g., scanned field 530) in the scanned data source. And, when additional identity data sources are available, the entire process may be repeated for each of the scanned fields (510, 520, 530) and the attribute field(s) contained in the additional identity data sources.

It will be appreciated that sample scan techniques may be employed to search structured data sources, including identity data sources, primary data sources and/or secondary data sources. It will be further appreciated that sample scan techniques may also be employed to search any unstructured data sources. Due to the variable nature of unstructured data sources, sample scan techniques may employ a mix of scanning entire files out of a sample group of files and/or sampling a subset of all files according to the methods described above.

Figure 6:
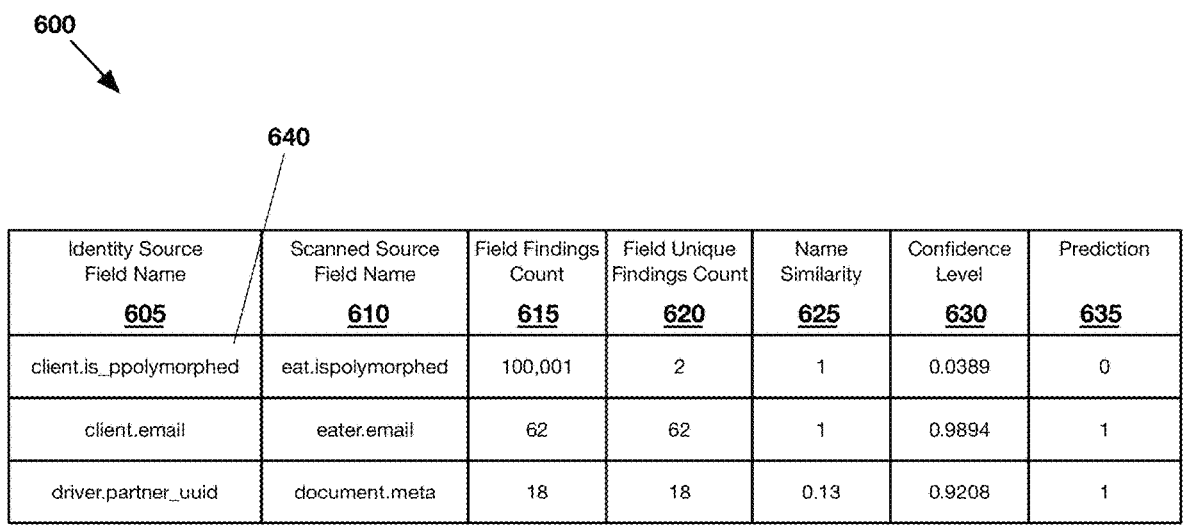
FIG. 6 shows an exemplary output of a machine learning model employed to classify fields in a scanned data source.

Referring to FIG. 6, an exemplary table 600 depicting predictive results for matching attribute fields to data source fields is illustrated. As shown, the output table 600 comprises the following labels: identity source field name 605, scanned source field name 610, field findings count 615, field unique findings count 620, name similarity 625, confidence level 630, and classification or prediction 635.

As discussed above, the machine learning model employs a number of features to compare fields in a scanned data source to fields in one or more identity data sources to determine a confidence level 630. In the illustrated embodiment, the field findings count 615 and field unique findings count 620 are shown to provide a strong indicator of whether the scanned data source field contains personal information. For example, if the field unique findings count 620 is close to the number of findings 615, then the scanned source field is likely to include personal information.

On the other hand, name similarity 625 may be a weaker indicator of whether a scanned source field includes personal information that corresponds to a given field in an identity data source. For example, even in instances where the scanned source field name 610 is similar or identical to the identity source field name 605, the data stored in the scanned source field will not necessarily hold meaningful personal information. This is shown, for example, in row 640, where the identity source field name 605 is nearly identical to the scanned source field name, but the model determines a confidence level of only 0.0389.

FIG. 6 further shows that the machine learning model may classify and label 635 each of the scanned source fields based on the confidence level 630 determined for such field. For example, the system may indicate that a scanned source field contains personal information (and, specifically, the same type of personal information as a given attribute field) by including a "1" in the corresponding prediction column 635. And the system may indicate a classification of no personal information by including a "0" in such column. As explained below, such classification is based on a determination of whether the confidence level is greater than or equal to a predetermined minimum threshold.

Figure 7:
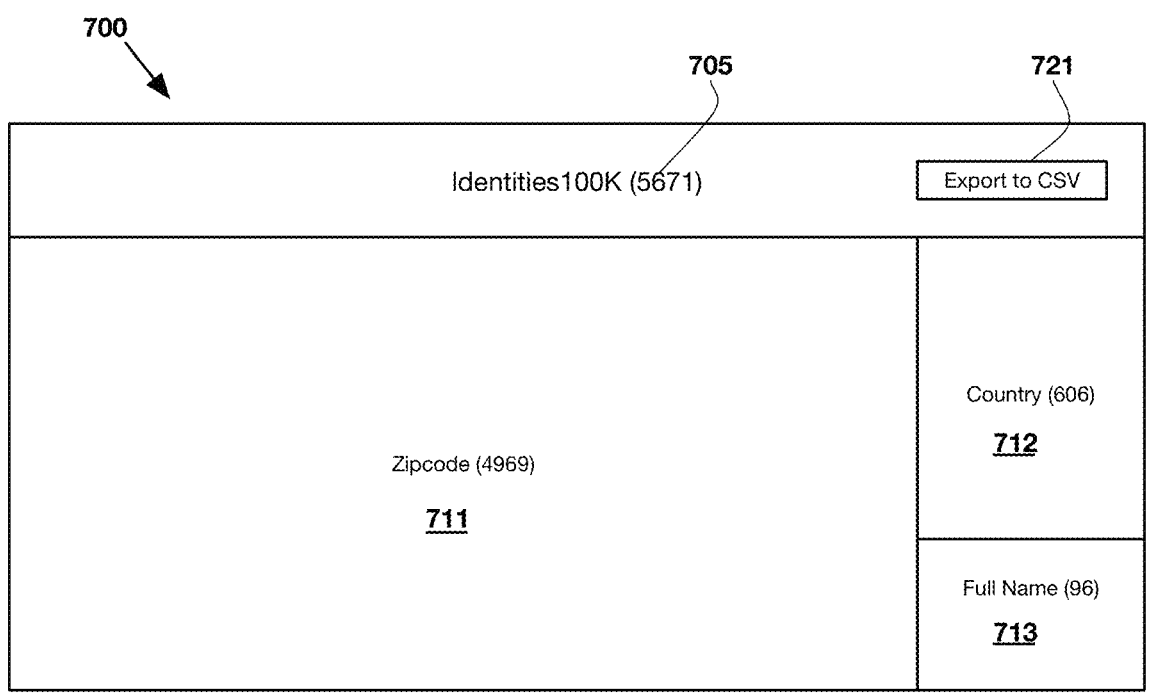
FIG. 7 shows an exemplary scan results heat map screen.

Referring to FIG. 7, in one embodiment, scan results may be presented in the form of a heat map report 700 accessible by one or more users of the system (e.g., via a client application). As shown, the heat map may display the number of personal information findings 705 found in the scanned data source, along with the attribute(s) determined for such findings (e.g., zip code 711, country 712 and full name 713). The heat map may further display an option to export the data 721, for example to a CSV file.

Generally, the heat map 700 may allow users to drill down from top level data sources (e.g., data center endpoints and/or cloud storage systems) to a column level view. This has benefits in multiple use cases, including cloud migrations where assessment of server data sensitivity is essential, as well as developer environments where data stores and microservices should be monitored for potential personal information contamination.

Figure 8:
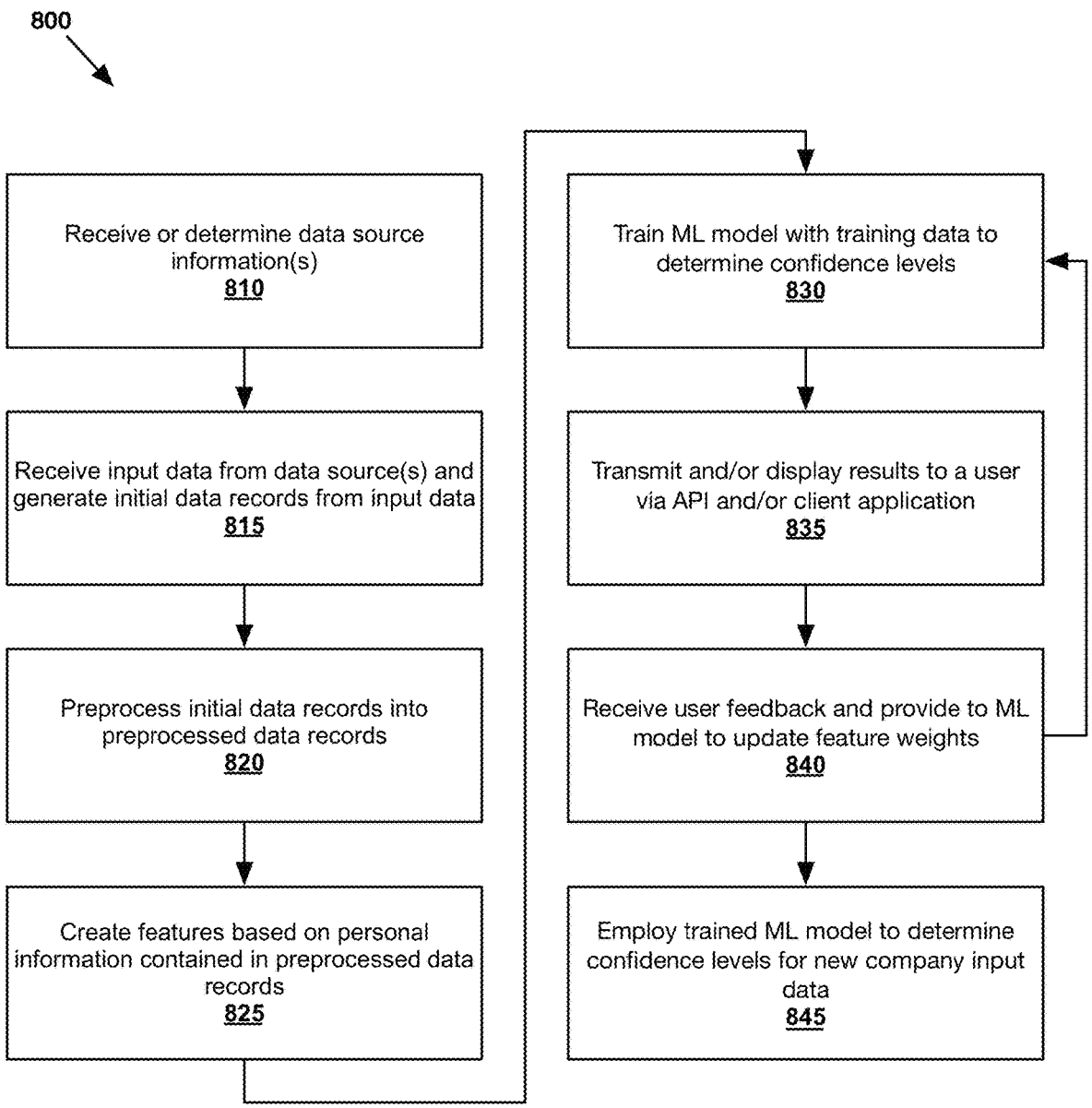
FIG. 8 shows an exemplary method of training a machine learning model to classify fields in a scanned data source.

Referring to FIG. 8, an exemplary flow diagram 800 depicting training and use of a personal information classification machine learning model is illustrated. As explained above, the system may employ a machine learning model to calculate confidence levels in order to classify scanned data source fields according to a personal information attribute.

Before a model can accurately determine confidence levels, it must be configured and trained. In one embodiment, a user may input various model information into the system to configure a given machine learning model. Exemplary model information may include, but is not limited to, a definition of a target variable or outcome for which predictions are to be made, transformation or activation function information relating to the training data to be employed by the model and/or initial parameters/weights.

Generally, the "learning" or "training" of a machine learning model refers to altering or changing model parameters to improve the overall predictive performance of the model. Determining the specific parameters w to be used in a model is an example of the more general problem of learning a mapping from data. Given a training data set D comprising a number N of examples of pairs of input and corresponding output observations (i.e., D={$(x_1, y_1)$ . . . , $(x_N, y_N)$}), the goal is to learn a mapping that approximates the mapping on the training set and, importantly, that also generalizes and/or extrapolates well to unseen test data drawn from the same probability distribution as the pairs in the training data set D.

To learn such a mapping, an error function is defined to measure the positive utility (in the case of an objective function) or the negative utility (in the case of a loss function) of a mapping that provides an output y' from input x when the desired output is y. When the error function is a loss function, the error on a given training dataset may be defined for a mapping as the sum of the losses (i.e., empirical loss).

Many error functions may be employed to train the disclosed machine learning models, including functions that include regularization terms that prevent overfitting to the training data, functions derived from likelihoods or posteriors of probabilistic models, functions that are based on sub-sampling large data sets, or other approximations to the loss function of interest (so called "surrogate loss functions"). Generally, the error may be computed either on the entire training data or may be approximated by computing the error on a small sub-sample (or mini-batch) of the training data.

Training generally occurs based on some example data D, by optimizing the error function E using an optimization algorithm. For example, the error function can be minimized by starting from some initial parameter values $w_0$ and then taking partial derivatives of $E(w,D)$ with respect to the parameters w and adjusting w in the direction given by these derivatives (e.g., according to the steepest descent optimization algorithm). It will be appreciated that any number of optimization algorithms may be employed to train the disclosed machine learning models, including, for example, the use of stochastic gradients, variable adaptive step-sizes, second-order derivatives, approximations thereof and/or combinations thereof.

As shown in FIG. 8, the system connects to the one or more data sources in order to ingest and store input data contained therein 810. In one embodiment, the system may run scheduled queries or processes to pull input data from the data sources. In other embodiments, the system may provide an endpoint for authorized users to upload input data for processing.

At step 815, the system processes the ingested input data in accordance with a centralized data schema to create initial data records. In one embodiment, the system determines various metadata relating to the input data and transactions associated therewith (e.g., an authorized user, a time of ingestion, data source information, row counts and/or others). The system may then associate such metadata with a corresponding initial data record.

At step 820, the system performs various preprocessing steps to clean, validate and/or normalize the initial data records into preprocessed data records. Such preprocessing may be required to create preprocessed data records comprising data tables having a standardized format or schema. Although machine learning techniques are well-equipped to handle common problems of incomplete and/or inaccurate data, the system may employ preprocessing, cleaning and/or regularization to ensure the creation of high-quality predictive features. As used herein, the term "table" is used in its broadest sense to refer to a grouping of data into a format providing for ease of interpretation or presentation. Such formats may include, but are not limited to, data provided from execution of computer program instructions or a software application, a table, a spreadsheet, etc.

During preprocessing, the system may perform any number of data manipulations on the initial data records to create preprocessed data records therefrom. Some exemplary manipulations may include: joins (an operation performed to establish a connection between two or more database tables, thereby creating a relationship between the tables), filters (a program or section of code that is designed to examine each input or output request for certain qualifying criteria and then process or forward it accordingly), aggregations (a process in which information is gathered and expressed in a summary form for purposes such as statistical analysis), caching (i.e., storing results for later use), counting, renaming, searching, sorting, and/or other table operations. Such preprocessing ensures, for example, that all information associated with the preprocessed data records comprises standardized naming conventions, filesystem layout, and configuration variables.

In one embodiment, the system may identify personal information findings from the input data based on personal information rules. The system may further identify metadata associated with such findings, such as but not limited to, an attribute type, a field name (e.g., a name of a column in a database in which the personal information is located), a field value (which may be hashed for privacy reasons), a scan ID, data source information corresponding to the data source where the personal information is stored (e.g., name, type, location, access credentials, etc.) and/or location information corresponding to a location within the data source where the personal information is stored (e.g., table, column, row, collection, etc.). Upon identifying such information in an initial data record, the system may aggregate, encode and sort this information into a findings file.

At step 825, various predictive features are created from the preprocessed information. Such features may be provided to the machine learning model to determine predictive values (i.e., feature weights) of the features, a confidence level and a classification based on the confidence level.

Generally, each of the features employed by the embodiments will comprise an individual value relating to one or more specific aspects of the processed information generated at step 820. And each feature may be created via one or more processing steps performed in relation to the associated value(s), such as: log-scaling count variables, bucketing variables, binning variables, and/or determining values (e.g., counts, maximums, minimums, means, medians, modes, standard deviations, etc.).

In certain embodiments, features may be created by (1) subjecting the preprocessed information to any number of combinations, aggregations, transformations, normalizations and/or imputations, and (2) calculating one or more summary statistics for the resulting data. Exemplary summary statistics may include, but are not limited to: count, mean value, median value, modal value, and/or standard deviation.

Features may also be created by calculating ratios of values, ratios of value aggregations and/or ratios of value aggregation standardizations. Additionally, various features relating to comparisons of such information may be created. The machine learning models described herein may be employed to determine important ratios and combinations of information to achieve a high predictive performance.

It will be appreciated that features may be standardized or transformed in various ways depending on the modeling technique employed (e.g., to make the model more stable). For example, a logistic regression model may be sensitive to extreme values and it can be helpful to aggregate information attributes into buckets and incorporate attributes individually as a feature. However, a random forest model is partition-based and, therefore, less sensitive to extreme values.

In one embodiment, the model may employ some or all of the features discussed above. Accordingly, training data relating to some or all of such features may be generated and employed to train the machine learning model at step 830.

FIG. 9 shows exemplary labeled training data 900 that may be provided to train the machine learning models on a number of supervised use cases (e.g., a minimum of 4,000 use cases). As shown, each row of the training data 900 may comprise an attribute field name 901 corresponding to an attribute field in an identity data source, a scanned field name 902 corresponding to a scanned field in a scanned data source for which a confidence level is determined, and a label 950 indicating whether the scanned field should be classified as containing personal information associated with the same attribute as that of the attribute field.

The training data 900 may further comprise values associated with features used by the machine learning models, such as but not limited to: field values count 905, field findings count 910, field unique findings count 915, attribute records count 920, field record count 925, MARTC 930, a count of sure matches 935, a count of full matches 940, and/or a count of sure and full matches 945. It will be appreciated that the training data may additionally or alternatively comprise values relating to any of the predictive features discussed herein.

In any event, the training data 900 may be provided to the machine learning model at step 835 such that it may analyze the information contained therein to determine confidence levels and classify scanned fields according to personal information attributes. The system may then perform any number of additional actions at step 835. For example, the system may then display the predictive results and corresponding confidence levels to the user at step 835.

In certain embodiments, the system may employ a supervised active learning process to train a machine learning model to classify personal information (e.g., to create and/or update personal information rules). As shown, the user may be able to train and retrain the model by tailoring the algorithm to specific properties of the user's data in order to produce more accurate predictive results. For example, upon displaying predictive results relating to the training data at step 835, the user may review the results and provide feedback 840 (e.g., reject one or more of the results). The user feedback may then be provided to the machine learning model such that the training process is repeated until the user indicates that they are satisfied with the predictive results and/or until a predetermined stopping criterion is reached.

Once trained, the model may then be translated (e.g., to Java or JavaScript) and incorporated into a privacy management platform such that it may be used to classify personal information findings based on input information. That is, the trained machine learning models can be employed to determine confidence levels for new input data as desired or required 845. In some embodiments, the model may be exported to a file (binary or textual) and loaded by a module (e.g., a Java or JavaScript module). The loaded model may be used to generate predictive results.

Accordingly, newly available information may be re-ingested and preprocessed, and then features may be calculated for the ML model to calculate revised confidence levels based on the relative feature weights generated on the training data. In one embodiment, the ML model may re-calculate the individual confidence levels at regular intervals as new data are made available (e.g., daily, weekly or monthly). Moreover, the system may associate such confidence levels with stored personal information records corresponding to classified scanned fields.

In one embodiment, performance metrics may also be calculated based on the confidence levels and classifications determined by the model. It will be appreciated that a valid, robust model should expect similar performance metrics on the additional dataset as performance metrics calculated from a hold-out subsample of data that the model was originally trained on.

In order to employ a machine learning system in practice, a confidence threshold must be selected where the system indicates that a scanned field corresponds to an attribute field only when a determined confidence level is higher than the threshold. It will be appreciated that, as the threshold is increased, the number of false-positives will decrease, but the number of false-negatives will increase. Conversely, as the threshold is decreased, the number of false-positives increases, but the number of false-negatives decreases. Accordingly, assessing the optimal threshold for a given model involves deciding on an appropriate tradeoff between false-positive and false-negative results.

In the context of the current embodiments, there is generally a larger penalty for false-negatives and a smaller penalty for false-positives. As an example, failing to identify information as personal information (i.e., a false-negative) may result in an organization being fined and/or losing customer confidence, while incorrectly identifying information as personal information (i.e., a false-positive) may result in the organization unnecessarily monitoring and protecting the information. Although the penalty for the false-negative is larger than that for the false-positive, it will be appreciated that monitoring and securing data can be expensive; a balance must be struck.

A number of metrics may be calculated to assess the performance of the disclosed models, including, sensitivity (i.e., recall or true-positive rate) and precision (i.e., true-negative rate). As shown in Equation 1, below, sensitivity corresponds to the Y-axis of a receiver operating characteristic ("ROC") curve, where each point corresponds to a threshold at which a prediction is made. Sensitivity provides the percentage of information that is correctly identified as a personal information attribute for some predictive threshold. It will be appreciated that a higher recall corresponds to a lower prediction threshold, which in turn reflects a preference to avoid false negatives over false positives.

$$\text{Recall} = \frac{|\{\text{valid outcomes}\} \cap \{\text{predicted outcomes}\}|}{|\{\text{valid outcomes}\}|} \qquad (1)$$

As shown in Equation 2, below, precision corresponds to the X-axis of the ROC curve and measures the proportion of actual negatives that are correctly identified below a given threshold.

$$\text{Precision} = \frac{|\{\text{valid outcomes}\} \cap \{\text{predicted outcomes}\}|}{|\{\text{predicted outcomes}\}|} \qquad (2)$$

The disclosed machine learning models may achieve very high levels of performance in classifying personal information across data source fields having widely varying characteristics. For example, the models may be configured to achieve a recall and/or precision of from about 0.8 to about 0.98. In certain embodiments, the models may be configured to achieve a recall and/or precision of at least about 0.8, at least about 0.85, at least about 0.9, or at least about 0.95.

Figure 10:
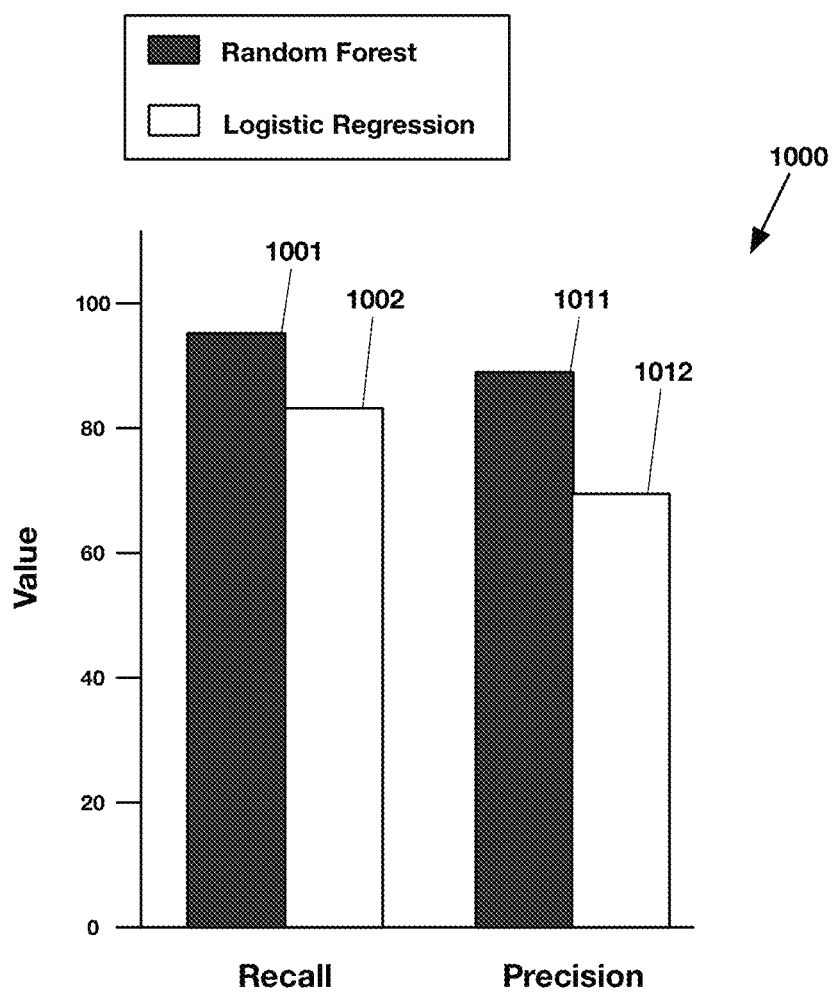
FIG. 10 shows a graph depicting performance metrics of random forest and logistic regression machine learning models.

Referring to FIG. 10, a graph 1000 depicting performance metrics of machine learning models that employed a random forest algorithm and a logistic regression algorithm is illustrated. As shown, the random forest machine learning model achieved a recall 1001 of about 97% and a precision 1011 of about 89%, while the logistic regression model achieved a recall 1002 of about 82% and a precision 1012 of about 68%. Accordingly, it was found that the random forest model outperformed the logistic regression model in classification.

Without wishing to be bound to a particular theory, it is believed that the random forest machine learning model outperformed other machine learning models due to better capability to handle complex relationships between features (e.g. name similarity is important only if field records count/field findings count is high). Moreover, the random forest algorithm is believed to outperform other classifiers and to generalize better because it allows for aggregation of results from numerous decision trees, each trained with only a subset of data comprising a cross-section of a portion of data features.

Figure 11:
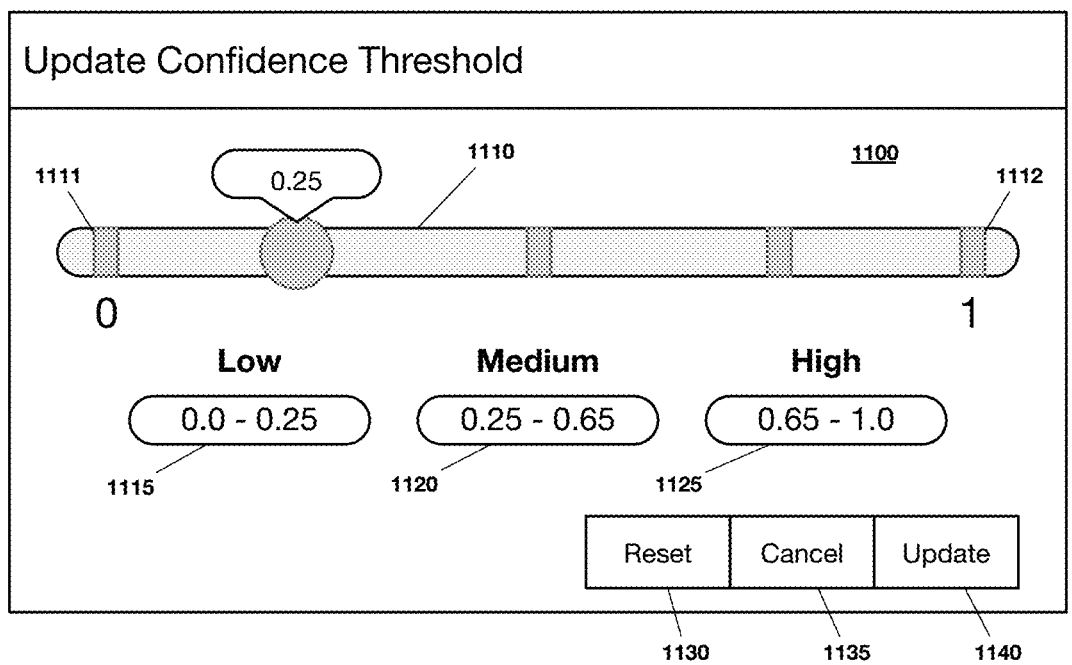
FIG. 11 shows an exemplary confidence threshold adjustment screen according to an embodiment.

Referring to FIG. 11, an exemplary confidence level threshold adjustment screen 1100 is illustrated. This screen 1100 may allow a user to adjust a confidence threshold employed by the machine learning models for classification purposes.

As shown, a user may adjust a bar 1110 ranging from a minimum confidence threshold (e.g., 0) 1111 to a maximum confidence threshold (e.g., 1) 1112. In the illustrated embodiment, the screen 1100 may also inform the user that a low confidence threshold 1115 ranges in value between 0 and 0.25, a medium confidence threshold 1120 ranges in value between 0.25 to 0.65, and a high confidence threshold 1125 ranges in value from 0.65 to 1.0.

By adjusting the confidence threshold, precision and recall levels will be changed. That is, increasing the confidence threshold will result in higher recall and less precision, while decreasing the confidence threshold will result in lower recall and higher precision. In any event, upon selecting a desired confidence threshold, the user may then either select a reset option 1130 to revert to default settings, a cancel option 1135 to exit the screen, or an update option 1140 to update the confidence threshold.

Referring to FIG. 12, an exemplary scan results review and modification screen 1200 is illustrated. As shown, this screen 1200 displays a table 1201 comprising results from a scanning process, as well as confidence levels 1210 determined for various scanned fields.

In one embodiment, the user may select one or more rows of results and modify the confidence level 1210 for each row. For example, the results may show a discrepancy between the confidence level of underlying data 1220 and the confidence level of corresponding metadata 1210 (e.g., low versus high).

In such circumstances, the user may be able to modify the confidence level relating to the metadata 1210 via an update confidence level modal or popup 1215. Such feature 1215 may provide an option (e.g., a dropdown menu) to allow the user to select an updated confidence level 1217. Upon selecting an updated confidence level 1217, the system may store the selection and then automatically retrain a machine learning model to predict results according to the adjusted confidence level 1217. The model may, therefore, learn that similarly looking observations should be assigned the adjusted confidence level 1217 specified by the user.

System

Figure 13:
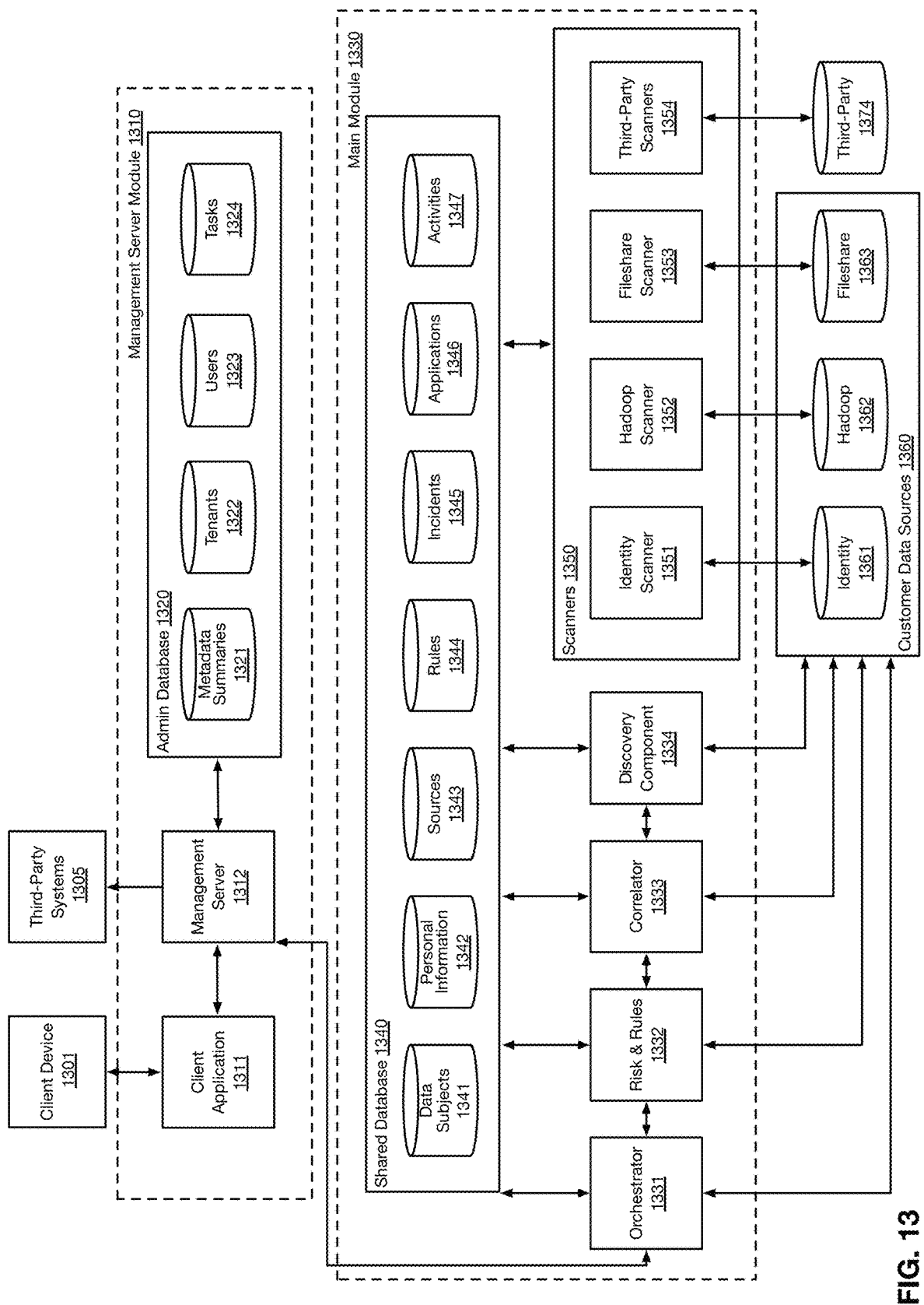
FIG. 13 shows an exemplary system.

Referring to FIG. 13, an exemplary system is illustrated. As shown, the system may comprise a microservices architecture that can be deployed from a public cloud or inside an organization's data center. This architecture allows the system to be deployed as a simple, single-server deployment or as a multitier, hybrid cloud environment comprising one or more on-premise and/or cloud-based applications.

The core system components may be designed as microservices that may be packaged in containers (e.g., DOCKER containers) to facilitate scalability and to allow flexible deployments. When components are decoupled and can each run in their own isolated environment, it is possible to scale the system by adding more instances of relevant microservices. The container images can be managed, version controlled and downloaded from a container hub, or loaded from compressed files in case the organization's environment does not allow hub access. Generally, each of the components may communicate via a REST API (or a message que for asynchronous jobs), and most services may be stateless. It will be appreciated that it is possible for several microservices to share the same container.

Although the system may employ a container service, the core deliverables may still be maintained in plain code (e.g., JavaScript, Java, etc.). Accordingly, the components can be packaged in different virtual machine images or even installed by an installer, if desired or required.

As shown, the system may comprise any number of modules, including but not limited to, a management server module 1310, which can be deployed either in the cloud or on-premise; and a main module 1330 which is typically deployed locally. In one embodiment, the main module 1330 comprises a number of components, such as a shared database component 1340, an orchestrator component 1331, a correlator component 1333, a risk analysis and rules evaluation component 1332, a data source discovery component 1334, and a number of scanner worker components 1350 (e.g., an identity scanner 1351, a Hadoop scanner 1352, a fileshare scanner 1353, and/or a third-party system scanner 1354).

The shared database component 1340 may store information in a number of database tables (1341-1347), such as: a data subjects table 1341, a personal information records table 1342, a data sources table 1343, a rules table 1344, an incidents table 1345, an applications table 1346 and/or an activities table 1347. As shown various components and/or microservices may access the shared database component 1340 to store and/or retrieve information.

In certain embodiments, a data source discovery component 1334 may be employed. The discovery component may be adapted to search for available data sources (e.g., using network discovery). Data source information associated with found data sources may be stored in the shared database 1340 (e.g., in the data sources table 1343).

As shown, the system may comprise a number of distributed, on-premise scanner worker components 1350 that are adapted to scan for and retrieve personal information findings from various data sources 1360, such as identity data sources 1361, primary data sources 1362, secondary sources 1363, and/or third-party data sources 1374. Each of the scanners 1350 may search for personal information in data sources based on one or more personal information rules stored in the shared database 1340 (e.g., in the rules table 1344). Moreover, each of the scanners 1350 may store retrieved personal information in the shared database 1340 (e.g., in the personal information database table 1342). As discussed above, exemplary personal information findings may include an attribute type, an attribute value and/or link, location information and/or a scanner ID. The scan results may also include metadata, such as but not limited to, personal information attributes, number of data subjects, etc., to allow for planning the workload (e.g., to retrieve some or all results for a particular attribute).

In one embodiment, the identity scanner 1351 may connect to one or more of a customer's identity data sources 1361 in order to determine the data subjects for whom identity graph profiles should be maintained by the system. As discussed above, such identity systems 1361 may include one or more structured databases (e.g., SQL), LDAP or other directory systems and/or applications such as CRM systems.

The identity scanner 1351 may connect to the identity system(s), retrieve relevant personal information, and store the results in the shared database component 1340. In certain embodiments, the identity scanner may expose an API to allow for: starting of the scan, checking of the scanner status, and/or retrieving results of a scan.

The primary data source scanner(s) (e.g., Hadoop scanner 1352) connect to an organization's primary data source(s) (e.g., Hadoop system 1362) in order to find personal information, as discussed above. In certain embodiments, the primary data source scanner(s) may expose an API to: start the scan, check status, and/or retrieve results relating to personal information. This scanner may submit a job to run a scan based on values in an input file. And such scanners may store results in the shared database 1340 (e.g., in the personal information table 1342) via the API.

The secondary data source scanner(s) (e.g., fileshare scanner 1353) connect to an organization's secondary data source(s) (e.g., fileshare system 1363) in order to find personal information, as discussed above. In certain embodiments, the secondary data source scanner(s) may expose an API to: start the scan, check status, and/or retrieve results relating to personal information. This scanner may submit a job to run a scan based on values in an input file. And such scanners may store results in the shared database 1340 (e.g., in the personal information table 1342) via the API.

In certain embodiments, the system may integrate with third-party systems and applications 1374, such as data protections systems. A third-party scanner 1354 may be employed to retrieve personal information findings and/or personal information records which can be leverage. Additionally or alternatively, the system may expose an API for third-party systems and applications 1305 to query stored data and/or metadata.

Generally, the system may be configured to scan multiple data sources of multiple types (e.g. Hadoop Server 1, Hadoop Server 2, Fileshare 1, Fileshare 2 and so on). In one embodiment, each type of data source may be scanned by a scanner 1350 specifically adapted to scan that type of data source. In other embodiments, a single scanner may be employed to scan multiple types of data sources.

Each of the scanners 1350 may leverage the target data source's native search capabilities and/or may run as part of the data source. For example, a Hadoop scanner 1351 may run a MapR job, while a SQL scanner (not shown) may run multiple queries (e.g., one for each column in each table, etc.).

Scalability may be achieved by adding more instances of a given scanner, where each scanner can pick up a scanning job and run in parallel to other scanners. Each scanner instance may check the shared database to see whether there are pending jobs ("scanning tasks") for it to take. And, when a scanning task exists, an appropriate scanner may be automatically triggered to perform the scan.

For some scanners, it may be desirable to achieve parallelism by splitting the work into separate scans. For example each personal information attribute may be separated to a different scan (e.g., a first scan may search for social security numbers and a second scan may search for full names). As another example, scans may be separated by alphabetical splitting (e.g., a first scan may search for full names beginning with letters a-f and a second scan may search for full names beginning with letters g-z). For certain scanners (e.g. Hadoop scanner 1351) the system's native parallelism may be exploited.

In one embodiment, the system may comprise an orchestrator component 1331 adapted to call and coordinate separate handlers and/or microservices. For example, the orchestrator component may interact with scanner components 1350, the correlator 1333, the risk and rules component 1332, data sources 1360, the shared database component 1340 and/or the management server component 1312. Generally, the orchestrator component 1331 receives information relating to a data subject's personal information and prepares the information for the scanners 1350 (e.g., via input files). It may also trigger the scanners and, upon completion, retrieve the results and transmit the same to the shared database component with additional metadata.

The orchestrator component 1331 may be responsible for one or more of the following: providing configuration data for the scanners 1350 (via input from a user); scheduling the scans, refreshes etc.; executing correlation logic to match between personal information findings and actual identities (e.g., based on personal information rules); executing static risk analysis on the inventory and updating the relevant risk scores; executing rule evaluation on the inventory and generating violations; and/or running business information processing (e.g. summary, aggregation, etc. required for the dashboards). In certain embodiments, the orchestrator 1331 may generate metadata summaries and/or upload the same to the management server component 1312. The orchestrator component 1331 can also run further processing, such as risk calculations and compliance determinations.

An exemplary orchestrator workflow may include the following steps: (1) run scan of identity source(s); (2) check when finished; (3) prepare a given scanner launch by retrieving, from the correlator component 1333, a list of attribute values to scan and creating an input file with the values; (4) run the given scanner 1350 with the input file; (5) determine that the scanner has completed the scan; and (6) call the correlator component to create personal information records from the scan results. Depending on specific requirements and/or constraints of any of the scanners, results may be written directly to the shared database 1340 such that the orchestrator component can read the results directly when the scan is complete.

The correlator component 1333 may be employed to define personal information and correlate any personal information findings to corresponding data subjects. The correlator component 1333 may be responsible for one or more of the following: (1) determining, retrieving, and/or updating personal information rule (e.g., stored in the rules table 1344 in the shared database 1340; (2) providing a list of searchable values to be used as input for the scanners 1350, based on the personal information rules; (3) searching for a matching data subject, upon receiving personal information findings from one or more scanners; and (4) when a match is found, creating a personal information record, including data subject name, unique data subject ID, attribute name, data source, and/or data link and storing the same in the shared database 1340 (e.g., in the personal information table 1342 and/or the data subjects table 1341).

It will be appreciated that personal information findings, as well as the personal information attributes received from the identity scanners, may include sensitive values. Where possible, the system may only store hashed values of such attributes. Where not possible, all temporary data kept for correlation may be wiped after it completes, as all other places in the system need only to hold/use a pointer to the data and not the actual values.

In certain embodiments, the system may further comprise a risk and rules component 1332 that provides activity information relating to data sources 1360, including but not limited to, applications, accounts, and/or personal information records that are used or accessed. Such activity data may be determined via SIEM, digital asset management ("DAM") and/or cloud access security broker ("CASB") products. And such data may be stored in the shared database (e.g., in the activities table 1347).

The risk and rules component 1332 may be further adapted to calculate risk scores for each personal information record. As discussed above, risk may additionally or alternatively be calculated for one or more of the following: users, data subjects, personal information attributes, systems and/or an entire organization. Such calculations may be based on static parameters, such as personal information attributes and weights, and/or dynamic parameters, such as frequency of use and type of access (e.g., read/write, etc.).

The risk and rules component may further be employed to review personal information records based on predetermined, learned and/or user-created compliance regulations/rules (e.g., users from Germany must have their data stored in Germany). This component may be designed to report rule violations and/or to allow such rule violations in certain cases.

Still referring to FIG. 13, the system further comprises a cloud-based management server module 1310. This module comprises a number of components, including an administrative database component 1320, a management server 1312, and a client application component 1311.

The administrative database component 1320 may store information in a number of database tables (1321-1324), such as a metadata summaries table 1321, a tenants information table 1322, a users table 1323 and/or a tasks table 1324. As shown various components and/or microservices may access the administrative database component 1320 to store and/or retrieve information.

The system may further comprise a client application 1311 to display information in graphical format to any number of users. The client application 1311 may comprise a multi-tenant, web-based application (e.g., using AngularJS) that runs on a web browser of a client device 1301. As discussed above, the client application may allow for the management and protection of personal information through the remote management of the on-premise elements of the different tenants. The client application 1311 may comprise a SaaS distributed application packaged in containers and remotely hosted to allow simple porting to be delivered as an on-premise, private-cloud application.

In certain embodiments, a user may access the client application to perform customer registration activities. For example, the client application may allow the user to download and register on-premise elements; setup and manage personal information discovery tasks; perform software updates to self-service elements; monitor system health; and/or access any of the above described dashboards and features of the platform.

Although not shown, in certain embodiments, an analytics and configuration component may be employed to provide the backend for an API consumed by one or more user interface screens of the client application. This component may send instructions to the main module 1330 by adding activities, such as activities polled by the main module.

Figure 14:
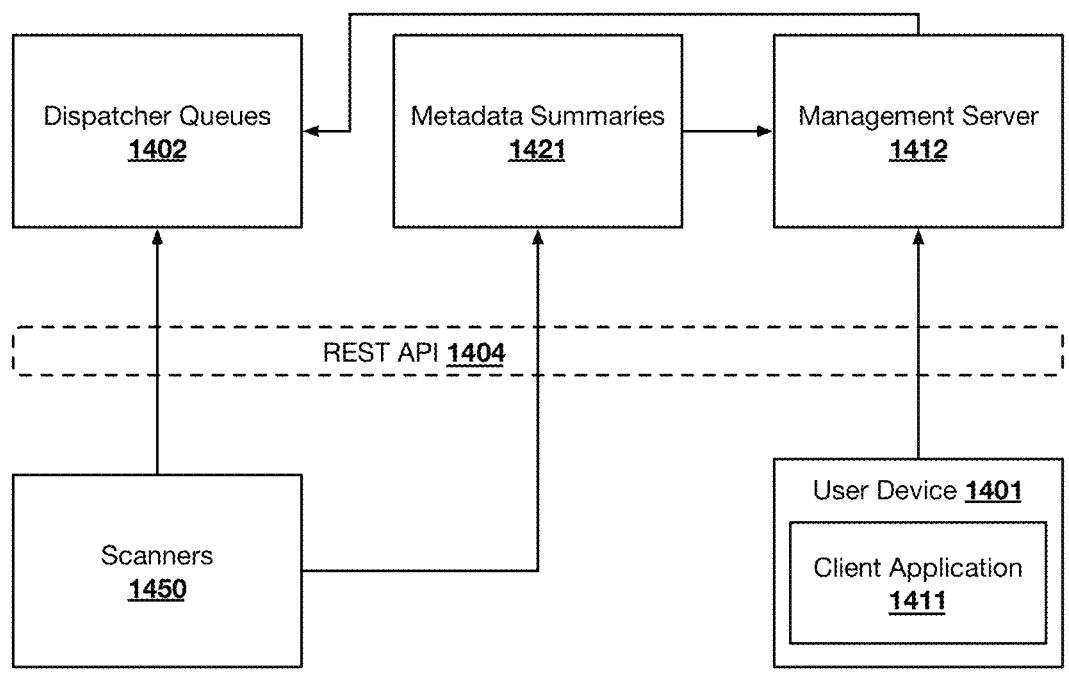
FIG. 14 shows an exemplary data flow diagram.

Referring to FIG. 14, an exemplary data flow diagram is illustrated. As shown, in one embodiment, a client application 1411 running on a client device 1401 (e.g., via a browser or browser-like application) may communicate with the management server 1412 through a set of REST APIs 1404. In this embodiment, all graphical user interface ("GUI") commands may be dispatched through a dispatcher queue 1402 and may be polled by system components to rely only on outgoing calls from the on-premise components. This avoids the need for any ports opened on a firewall.

All statistics and metadata regarding scans and/or the health of the system produced by the scanners 1450 may be stored on a metadata summaries cache database 1421 on the server side to allow for a responsive user experience. In one embodiment, only metadata summaries may be uploaded to the management server 1412 so that personal information does not reach the server. Accordingly, such metadata summaries may be stored only in the cloud.

Embodiments of the subject matter and the functional operations described in this specification can be implemented in one or more of the following: digital electronic circuitry; tangibly-embodied computer software or firmware; computer hardware, including the structures disclosed in this specification and their structural equivalents; and combinations thereof. Such embodiments can be implemented as one or more modules of computer program instructions encoded on a tangible non-transitory program carrier for execution by, or to control the operation of, data processing apparatus (i.e., one or more computer programs). Program instructions may be, alternatively or additionally, encoded on an artificially generated propagated signal (e.g., a machine-generated electrical, optical, or electromagnetic signal) that is generated to encode information for transmission to suitable receiver apparatus for execution by a data processing apparatus. And the computer storage medium can be one or more of: a machine-readable storage device, a machine-readable storage substrate, a random or serial access memory device, and combinations thereof.

As used herein, the term "data processing apparatus" comprises all kinds of apparatuses, devices, and machines for processing data, including but not limited to, a programmable processor, a computer, and/or multiple processors or computers. Exemplary apparatuses may include special purpose logic circuitry, such as a field programmable gate array ("FPGA") and/or an application specific integrated circuit ("ASIC"). In addition to hardware, exemplary apparatuses may comprise code that creates an execution environment for the computer program (e.g., code that constitutes one or more of: processor firmware, a protocol stack, a database management system, an operating system, and a combination thereof).

The term "computer program" may also be referred to or described herein as a "program," "software," a "software application," a "module," a "software module," a "script," or simply as "code." A computer program may be written in any form of programming language, including compiled or interpreted languages, or declarative or procedural languages, and it can be deployed in any form, including as a standalone program or as a module, component, subroutine, or other unit suitable for use in a computing environment. Such software may correspond to a file in a file system. A program can be stored in a portion of a file that holds other programs or data. For example, a program may include one or more scripts stored in a markup language document; in a single file dedicated to the program in question; or in multiple coordinated files (e.g., files that store one or more modules, sub programs, or portions of code). A computer program can be deployed and/or executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as but not limited to an FPGA and/or an ASIC.

Computers suitable for the execution of the one or more computer programs include, but are not limited to, general purpose microprocessors, special purpose microprocessors, and/or any other kind of central processing unit ("CPU"). Generally, CPU will receive instructions and data from a read only memory ("ROM") and/or a random access memory ("RAM"). The essential elements of a computer are a CPU for performing or executing instructions and one or more memory devices for storing instructions and data. Generally, a computer will also include, or be operatively coupled to receive data from or transfer data to, or both, one or more mass storage devices for storing data (e.g., magnetic, magneto optical disks, and/or optical disks). However, a computer need not have such devices. Moreover, a computer may be embedded in another device, such as but not limited to, a mobile telephone, a personal digital assistant ("PDA"), a mobile audio or video player, a game console, a Global Positioning System ("GPS") receiver, or a portable storage device (e.g., a universal serial bus ("USB") flash drive).

Computer readable media suitable for storing computer program instructions and data include all forms of nonvolatile memory, media and memory devices. For example, computer readable media may include one or more of the following: semiconductor memory devices, such as erasable programmable read-only memory ("EPROM"), electrically erasable programmable read-only memory ("EEPROM") and/or and flash memory devices; magnetic disks, such as internal hard disks or removable disks; magneto optical disks; and/or CD-ROM and DVD-ROM disks. The processor and the memory can be supplemented by, or incorporated in, special purpose logic circuitry.

To provide for interaction with a user, embodiments may be implemented on a computer having any type of display device for displaying information to a user. Exemplary display devices include, but are not limited to one or more of: projectors, cathode ray tube ("CRT") monitors, liquid crystal displays ("LCD"), light-emitting diode ("LED") monitors and/or organic light-emitting diode ("OLED") monitors. The computer may further comprise one or more input devices by which the user can provide input to the computer. Input devices may comprise one or more of: keyboards, a pointing device (e.g., a mouse or a trackball). Input from the user can be received in any form, including acoustic, speech, or tactile input. Moreover, feedback may be provided to the user via any form of sensory feedback (e.g., visual feedback, auditory feedback, or tactile feedback). A computer can interact with a user by sending documents to and receiving documents from a device that is used by the user (e.g., by sending web pages to a web browser on a user's client device in response to requests received from the web browser).

Embodiments of the subject matter described in this specification can be implemented in a computing system that includes one or more of the following components: a back-end component (e.g., a data server); a middleware component (e.g., an application server); a front end component (e.g., a client computer having a graphical user interface ("GUI") and/or a web browser through which a user can interact with an implementation of the subject matter described in this specification); and/or combinations thereof. The components of the system can be interconnected by any form or medium of digital data communication, such as but not limited to, a communication network. Non-limiting examples of communication networks include a local area network ("LAN") and a wide area network ("WAN"), e.g., the Internet.

The computing system may include clients and/or servers. The client and server may be remote from each other and interact through a communication network. The relationship of client and server arises by virtue of computer programs running on the respective computers and having a client-server relationship to each other.

Various embodiments are described in this specification, with reference to the detailed discussed above, the accompanying drawings, and the claims. Numerous specific details are described to provide a thorough understanding of various embodiments. However, in certain instances, well-known or conventional details are not described in order to provide a concise discussion. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the embodiments.

The embodiments described and claimed herein and drawings are illustrative and are not to be construed as limiting the embodiments. The subject matter of this specification is not to be limited in scope by the specific examples, as these examples are intended as illustrations of several aspects of the embodiments. Any equivalent examples are intended to be within the scope of the specification. Indeed, various modifications of the disclosed embodiments in addition to those shown and described herein will become apparent to those skilled in the art, and such modifications are also intended to fall within the scope of the appended claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

All references including patents, patent applications and publications cited herein are incorporated herein by reference in their entirety and for all purposes to the same extent as if each individual publication or patent or patent application was specifically and individually indicated to be incorporated by reference in its entirety for all purposes.

What is claimed is:

1. A computer-implemented method of finding and classifying personal information in a data source, the method comprising:
   determining, by a computer, a plurality of personal information findings in a scanned data source comprising a first scanned field associated with first scanned values, the plurality of personal information findings comprising:
      a first set of personal information findings determined by comparing the first scanned values to first attribute values associated with a first attribute field in an identity data source; and
      a second set of personal information findings determined by comparing the first scanned values to second attribute values associated with a second attribute field in the identity data source;
   creating, by the computer, a plurality of personal information records from some or all of the plurality of personal information findings, there plurality of personal information records comprising:
      a first set of personal information records created from some or all of the first set of personal information findings; and
      a second set of personal information records created from some or all of the second set of personal information findings;
   calculating, by the computer, a first confidence level for the first scanned field and the first attribute field, said calculating based on one or more: a count of the first scanned values, a count of the first set of personal information findings, a count of the first set of personal information records, and a sum of the count of the first set of personal information records and a count of the second set of personal information records;
   calculating, by the computer, a second confidence level for the first scanned field and the second attribute field, said calculating based on one or more: the count of the first scanned values, a count of the second set of personal information findings, a count of the second set of personal information records, and the sum of the count of the first set of personal information records and the count of the second set of personal information records;
   upon determining that the first confidence level is greater than or equal to a minimum confidence threshold and that the second confidence level is less than the minimum confidence threshold, associating, by the computer, the first attribute field, but not the second attribute field, with the first scanned field in a database.

2. A computer-implemented method according to claim 1, wherein:
   the scanned data source further comprises a second scanned field associated with second scanned values;
   the plurality of personal information findings further comprises:
      a third set of personal information findings determined by comparing the first attribute values to the second scanned values; and
      a fourth set of personal information findings determined by comparing the second attribute values to the second scanned values;
   the plurality of personal information records further comprises:
      a third set of personal information records created from some or all of the third set of personal information findings; and
      a fourth set of personal information records created from some or all of the fourth set of personal information findings; and
   the method further comprises:
   calculating, by the computer, a third confidence level for the second scanned field and the first attribute field, said calculating based on one or more: a count of the second scanned values, a count of the third set of personal information findings, a count of the third set of personal information records, and a sum of the count of the third set of personal information records and a count of the fourth set of personal information records;
   calculating, by the computer, a fourth confidence level for the second scanned field and the second attribute field, said calculating based on one or more: the count of the second scanned values, a count of the fourth set of personal information findings, a count of the fourth set of personal information records, and the sum of the count of the third set of personal information records and the count of the fourth set of personal information records; and
   upon determining that the fourth confidence level is greater than or equal to the minimum confidence threshold and that the third confidence level is less than the minimum confidence threshold, associating the second attribute field, but not the first attribute field, with the second scanned field in the database.

3. A computer-implemented method according to claim 2, wherein:
   said calculating the first confidence level is further based on a sum of the count of the first set of personal information records and a count of the third set of personal information records;
   said calculating the second confidence level is further based on a sum of the count of the second set of personal information records and a count of the fourth set of personal information records;
   said calculating the third confidence level is further based on the sum of the count of the first set of personal information records and the count of the third set of personal information records; and
   said calculating the fourth confidence level is further based on the sum of the count of the second set of personal information records and the count of the fourth set of personal information records.

4. A computer-implemented method according to claim 3, wherein:
said calculating the first confidence level is further based on a count of the first set of personal information findings that are associated with a unique first attribute value;
said calculating the second confidence level is further based on a count of the second set of personal information findings that are associated with a unique second attribute value;
said calculating the third confidence level is further based on a count of the third set of personal information findings that are associated with a unique first attribute value; and
said calculating the fourth confidence level is further based on a count of the fourth set of personal information findings that are associated with a unique second attribute value.

5. A computer-implemented method according to claim 4, wherein:
said calculating the first confidence level is further based on a count of the first set of personal information records that are associated with a unique first attribute value;
said calculating the second confidence level is further based on a count of the second set of personal information records that are associated with a unique second attribute value;
said calculating the third confidence level is further based on a count of the third set of personal information records that are associated with a unique first attribute value; and
said calculating the fourth confidence level is further based on a count of the fourth set of personal information records that are associated with a unique second attribute value.

6. A computer-implemented method according to claim 5, wherein:
said calculating the first confidence level is further based on a first count of sure matches relating to the first attribute field;
said calculating the second confidence level is further based on a second count of sure matches relating to the second attribute field;
said calculating the third confidence level is further based on the first count of sure matches relating to the first attribute field; and
said calculating the fourth confidence level is further based on the second count of sure matches relating to the second attribute field.

7. A computer-implemented method according to claim 6, wherein:
said calculating the first confidence level is further based on a first count of full matches relating to the first attribute field;
said calculating the second confidence level is further based on a second count of full matches relating to the second attribute field;
said calculating the third confidence level is further based on the first count of full matches; and
said calculating the fourth confidence level is further based on the second count of full matches.

8. A computer-implemented method according to claim 7, further comprising:
said calculating the first confidence level is further based on a first count of sure and full matches relating to the first attribute field;
said calculating the second confidence level is further based on a second count of sure and full matches relating to the second attribute field;
said calculating the third confidence level is further based on the first count of sure and full matches; and
said calculating the fourth confidence level is further based on the second count of sure and full matches.

9. A computer-implemented method according to claim 8, wherein:
said calculating the first confidence level is further based on a first name similarity value determined for a name associated with the first attribute field and a name associated with the first scanned field; and
said calculating the second confidence level is further based on a second name similarity value determined for a name associated with the second attribute field and the name associated with the first scanned field.

10. A computer-implemented method according to claim 9, wherein Levenshtein distance is employed to determine the first name similarity value and the second name similarity value.

11. A computer-implemented method according to claim 1, wherein scanned data source information associated with the scanned data source is stored in the database, the scanned data source information comprising one or more of: a total number of rows in the scanned data source, a subset of rows that were employed to determine the plurality of personal information findings, a total number of personal information findings determined for the subset of rows, and a total number of personal information records created for the total number of personal information findings.

12. A computer-implemented method according to claim 1, wherein the first attribute field and the second attribute field are each associated with a personal information attribute selected from the group consisting of: name, social security number, phone number, address, email address, license number, passport number, credit card number, username, date of birth, personal health information, educational information and combinations thereof.

13. A computer-implemented method according to claim 1, wherein a random forest or logistic regression machine learning model is employed to calculate the first and second confidence levels.

14. A system comprising one or more computers and one or more storage devices storing instructions that when executed by the one or more computers cause the one or more computers to perform operations comprising:
determining a plurality of personal information findings in a scanned data source comprising a first scanned field associated with first scanned values, the plurality of personal information findings comprising:
a first set of personal information findings determined by comparing the first scanned values to a first attribute values associated with a first attribute field in an identity data source; and
second set of personal information findings determined by comparing the first scanned values to second attribute values associated with a second attribute field in the identity data source for a different identity data source;
creating a plurality of personal information records from some or all of the plurality of personal information findings, the plurality of personal information records comprising:
a first set of personal information records created from some or all of the first set of personal information findings; and a second set of personal information records created from some or all of the second set of personal information findings;

calculating a first confidence level for the first scanned field and the first attribute field, said calculating based on one or more: a count of the first scanned values, a count of the first set of personal information findings, a count of the first set of personal information records, and a sum of the count of the first set of personal information records and a count of the second set of personal information records;

calculating a second confidence level for the first scanned field and the second attribute field, said calculating based on one or more: the count of the first scanned values, a count of the second set of personal information findings, a count of the second set of personal information records, and the sum of the count of the first set of personal information records and the count of the second set of personal information records; and upon determining that the first confidence level is greater than or equal to a minimum confidence threshold and that the second confidence level is less than the minimum confidence threshold, associating the first attribute field, but not the second attribute field, with the first scanned field in a database.

15. A system according to claim 14, wherein:
the scanned data source further comprises a second scanned field associated with second scanned values;
the plurality of personal information findings further comprises:
a third set of personal information findings determined by comparing the first attribute values to the second scanned values; and
a fourth set of personal information findings determined by comparing the second attribute values to the second scanned values;
the plurality of personal information records further comprises:
a third set of personal information records created from some or all of the third set of personal information findings; and
a fourth set of personal information records created from some or all of the fourth set of personal information findings; and
the operations further comprise:
calculating a third confidence level for the second scanned field and the first attribute field, said calculating based on one or more: a count of the second scanned values, a count of the third set of personal information findings, a count of the third set of personal information records, and a sum of the count of the third set of personal information records and a count of the fourth set of personal information records;
calculating a fourth confidence level for the second scanned field and the second attribute field, said calculating based on one or more: the count of the second scanned values, a count of the fourth set of personal information findings, a count of the fourth set of personal information records, and the sum of the count of the third set of personal information records and the count of the fourth set of personal information records; and
upon determining that the fourth confidence level is greater than or equal to the minimum confidence threshold and that the third confidence level is less than the minimum confidence threshold, associating the second attribute field, but not the first attribute field, with the second scanned field in the database.

16. A system according to claim 15, wherein:
said calculating the first confidence level is further based on a sum of the count of the first set of personal information records and a count of the third set of personal information records;
said calculating the second confidence level is further based on a sum of the count of the second set of personal information records and a count of the fourth set of personal information records;
said calculating the third confidence level is further based on the sum of the count of the first set of personal information records and the count of the third set of personal information records; and
said calculating the fourth confidence level is further based on the sum of the count of the second set of personal information records and the count of the fourth set of personal information records.

17. A system according to claim 16, wherein:
said calculating the first confidence level is further based on a count of the first set of personal information findings that are associated with a unique first attribute value;
said calculating the second confidence level is further based on a count of the second set of personal information findings that are associated with a unique second attribute value;
said calculating the third confidence level is further based on a count of the third set of personal information findings that are associated with a unique first attribute value; and
said calculating the fourth confidence level is further based on a count of the fourth set of personal information findings that are associated with a unique second attribute value.

18. A system according to claim 17, wherein:
said calculating the first confidence level is further based on a count of the first set of personal information records that are associated with a unique first attribute value;
said calculating the second confidence level is further based on a count of the second set of personal information records that are associated with a unique second attribute value;
said calculating the third confidence level is further based on a count of the third set of personal information records that are associated with a unique first attribute value; and
said calculating the fourth confidence level is further based on a count of the fourth set of personal information records that are associated with a unique second attribute value.

19. A system according to claim 18, wherein:
said calculating the first confidence level is further based on: a first count of sure matches relating to the first attribute field, a first count of full matches relating to the first attribute field and a first count of sure and full matches relating to the first attribute field;
said calculating the second confidence level is further based on: a second count of sure matches relating to the second attribute field, a second count of full matches relating to the second attribute field, and a second count of sure and full matches relating to the second attribute field;

said calculating the third confidence level is further based on the first count of sure matches, the first count of full matches, and the first count of sure and full matches; and said calculating the fourth confidence level is further based on the second count of sure matches, the second count of full matches, and the second count of sure and full matches.

20. A system according to claim 19, wherein:

said calculating the first confidence level is further based on a first name similarity value determined for a name associated with the first attribute field and a name associated with the first scanned field;

said calculating the second confidence level is further based on a second name similarity value determined for a name associated with the second attribute field and the name associated with the first scanned field;

said calculating the third confidence level is further based on a third name similarity value determined for the name associated with the first attribute field and a name associated with the second scanned field; and said calculating the fourth confidence level is further based on a fourth name similarity value determined for the name associated with the second attribute field and the name associated with the second scanned field.

* * * * *